(12) United States Patent
Hadwen et al.

(10) Patent No.: US 10,870,114 B2
(45) Date of Patent: Dec. 22, 2020

(54) EWOD CARTRIDGE POSITION SENSING WHEN DOCKED IN EWOD INSTRUMENT

(71) Applicant: Sharp Life Science (EU) Limited, Oxford (GB)

(72) Inventors: Benjamin James Hadwen, Oxford (GB); Oliver James Beard, Oxford (GB); Chris Clarke, Oxford (GB)

(73) Assignee: Sharp Life Science (EU) Limited, Oxford (GB)

( * ) Notice: Subject to any disclaimer, the term of this patent is extended or adjusted under 35 U.S.C. 154(b) by 168 days.

(21) Appl. No.: 16/298,063

(22) Filed: Mar. 11, 2019

(65) Prior Publication Data

US 2020/0290050 A1  Sep. 17, 2020

(51) Int. Cl.
| | |
|---|---|
| *G01N 27/447* | (2006.01) |
| *G01N 27/453* | (2006.01) |
| *B01L 3/00* | (2006.01) |
| *G02B 26/00* | (2006.01) |

(52) U.S. Cl.
CPC ...... *B01L 3/502792* (2013.01); *G02B 26/005* (2013.01); *B01L 2200/061* (2013.01); *B01L 2300/0645* (2013.01); *B01L 2300/0819* (2013.01); *B01L 2400/0427* (2013.01)

(58) Field of Classification Search
CPC ................................................ B01L 3/502792
See application file for complete search history.

(56) References Cited

U.S. PATENT DOCUMENTS

| | | | |
|---|---|---|---|
| 7,163,612 B2 | 1/2007 | Sterling et al. | |
| 7,939,021 B2 * | 5/2011 | Smith | B01F 13/0071 422/68.1 |
| 8,173,000 B1 | 5/2012 | Hadwen et al. | |
| 8,653,832 B2 | 2/2014 | Hadwen et al. | |
| 2014/0168539 A1 | 6/2014 | Kim et al. | |

(Continued)

OTHER PUBLICATIONS

Fair, R.B., "Digital microfluids: is a true lab-on-a-chip possible?" Microfluidics and Nanofluidics Jun. 2007, vol. 3, Issue 3, pp. 245-281.

*Primary Examiner* — Alexander S Noguerola
(74) *Attorney, Agent, or Firm* — Renner, Otto, Boisselle & Sklar, LLP

(57) ABSTRACT

A microfluidic system includes: an electro-wetting on dielectric (EWOD) cartridge having an element array configured to receive liquid droplets, the element array including individual array elements each including array element circuitry comprising sensing circuitry that is integrated into the array element circuitry; a microfluidic instrument that is configured to receive the EWOD cartridge and having an electrically conductive locator that is external to the EWOD cartridge; and a control system configured perform electrowetting operations by controlling actuation voltages applied to the element array to perform manipulation operations as to liquid droplets present on the element array. The control system further is configured to read an output from the sensing circuitry, determine a position of the locator relative to the element array based on the output, and determine a misalignment of the EWOD cartridge relative to the microfluidic instrument based on the position of the locator. The control system may adjust a droplet manipulation operation to compensate for the determined misalignment.

20 Claims, 19 Drawing Sheets

(56) References Cited

U.S. PATENT DOCUMENTS

2016/0178559 A1* 6/2016 Elder ................ A61B 5/14532
205/775
2017/0056887 A1* 3/2017 Hadwen ............ B01L 3/502792
2017/0076676 A1 3/2017 Hadwen
2018/0078934 A1 3/2018 Hadwen et al.

* cited by examiner

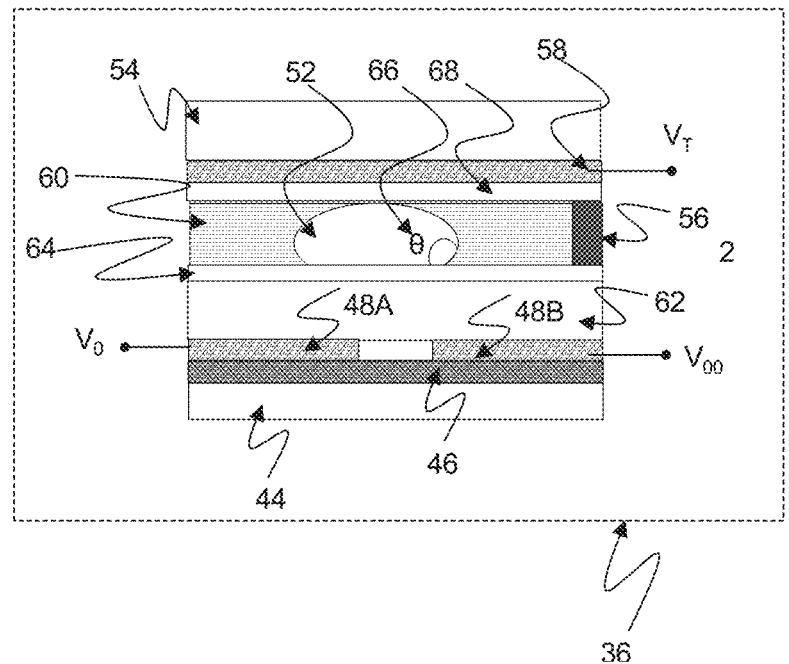
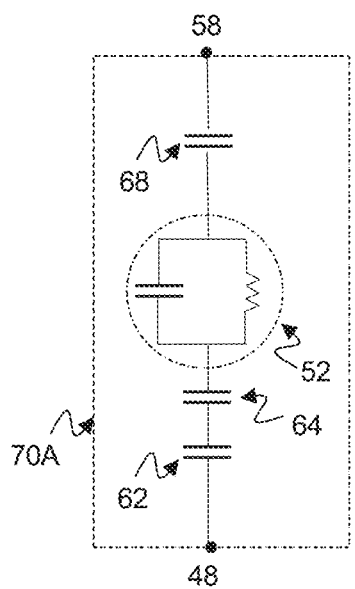
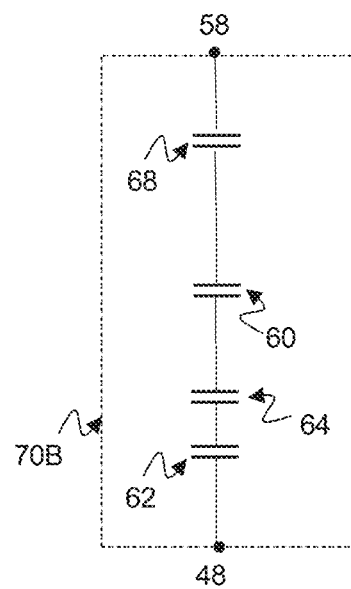

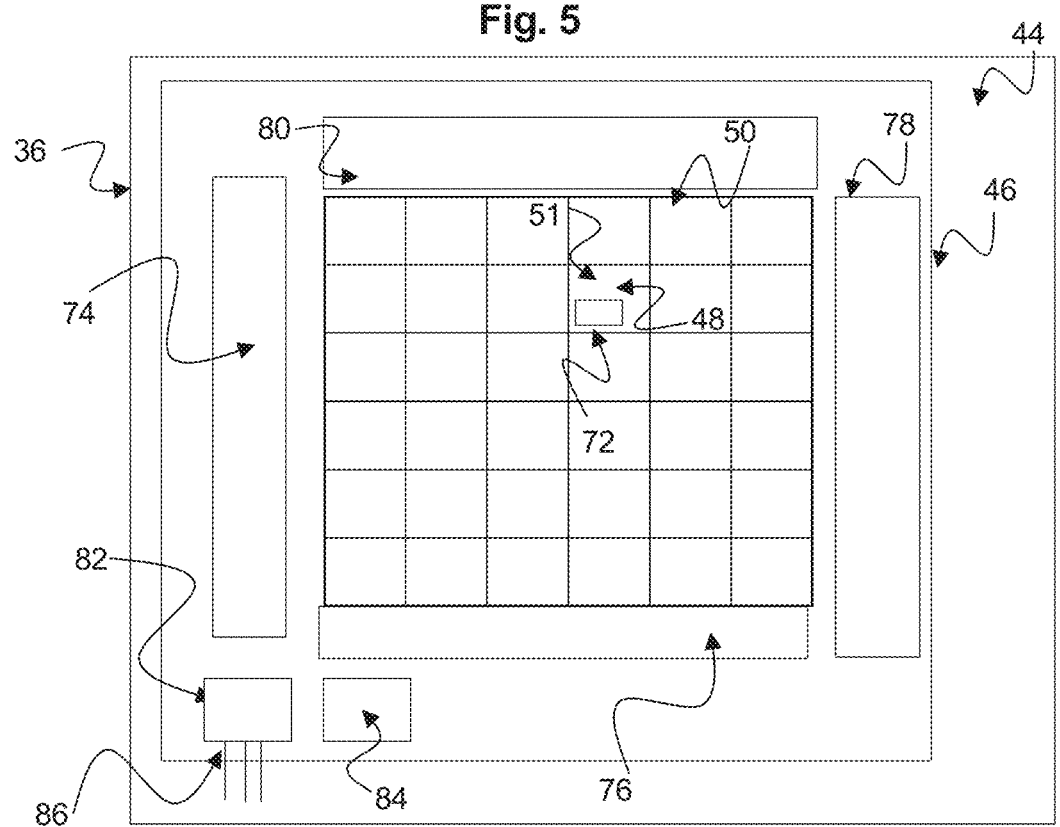

Fig. 10
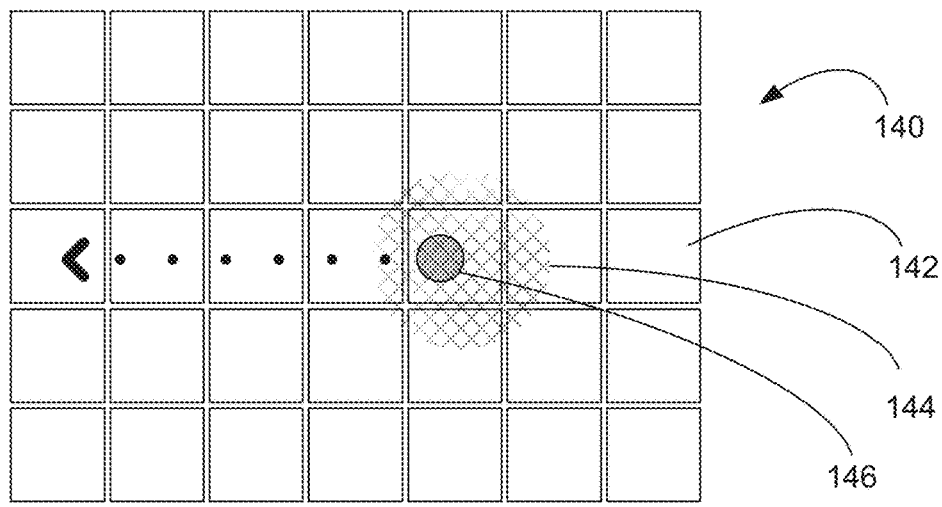
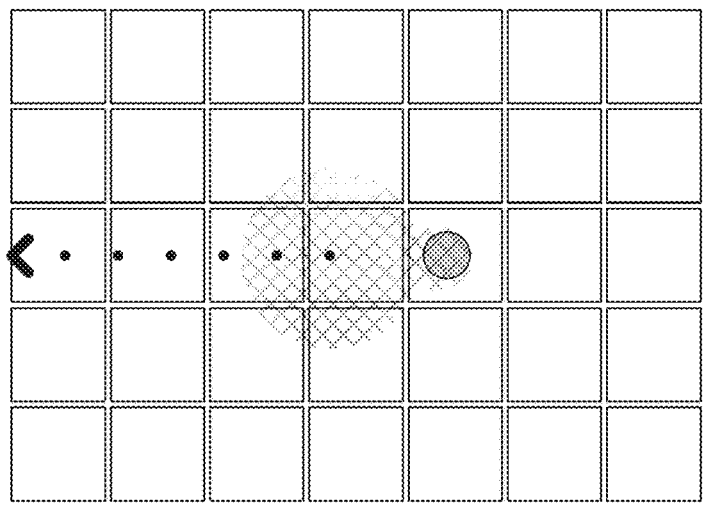
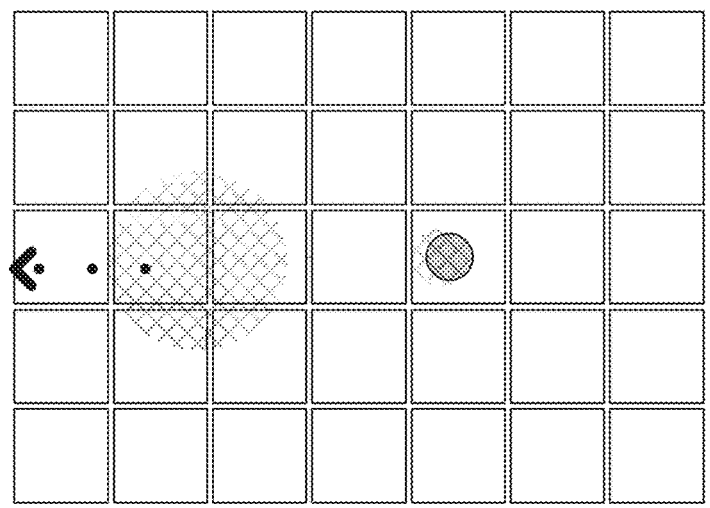

Fig. 13
 RST
RWS
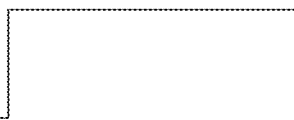 LOC
 Potential at Electrode
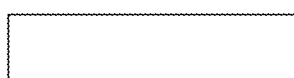 Potential at Electrode
- pixel in the array where locator is in close proximity
 Potential at Electrode<n>
- pixel in the array where locator is farther away
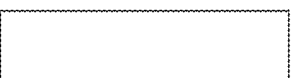 Current through COL
- pixel in the array where locator is in close proximity
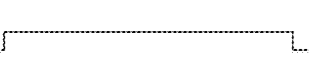 Current through COL
- pixel in the array where locator is farther away

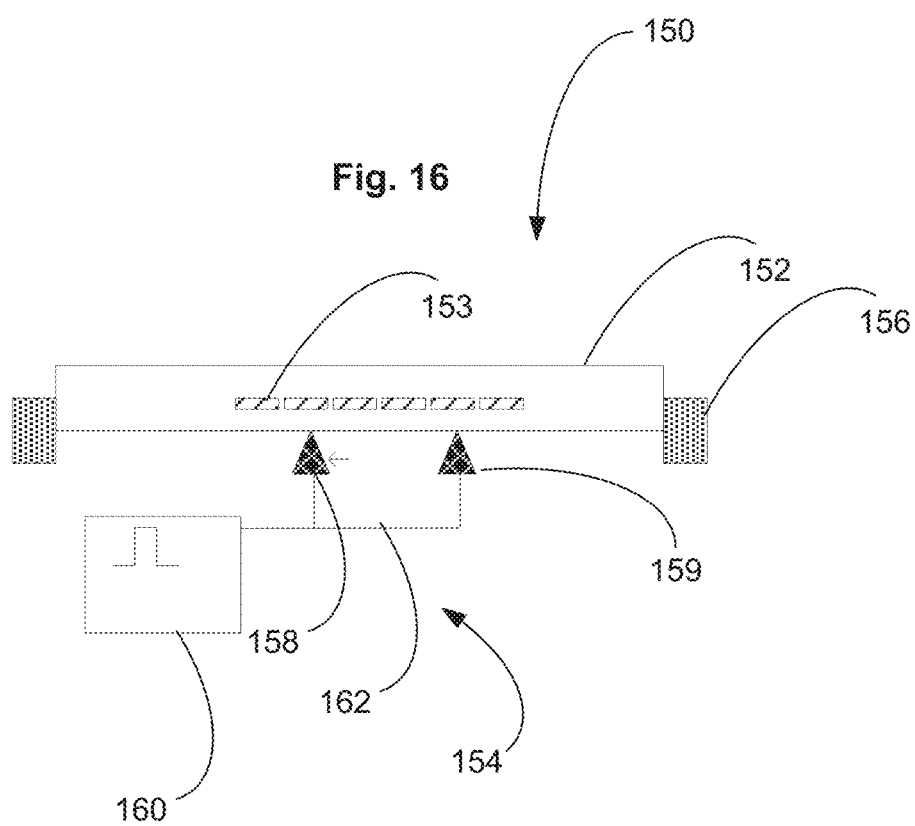

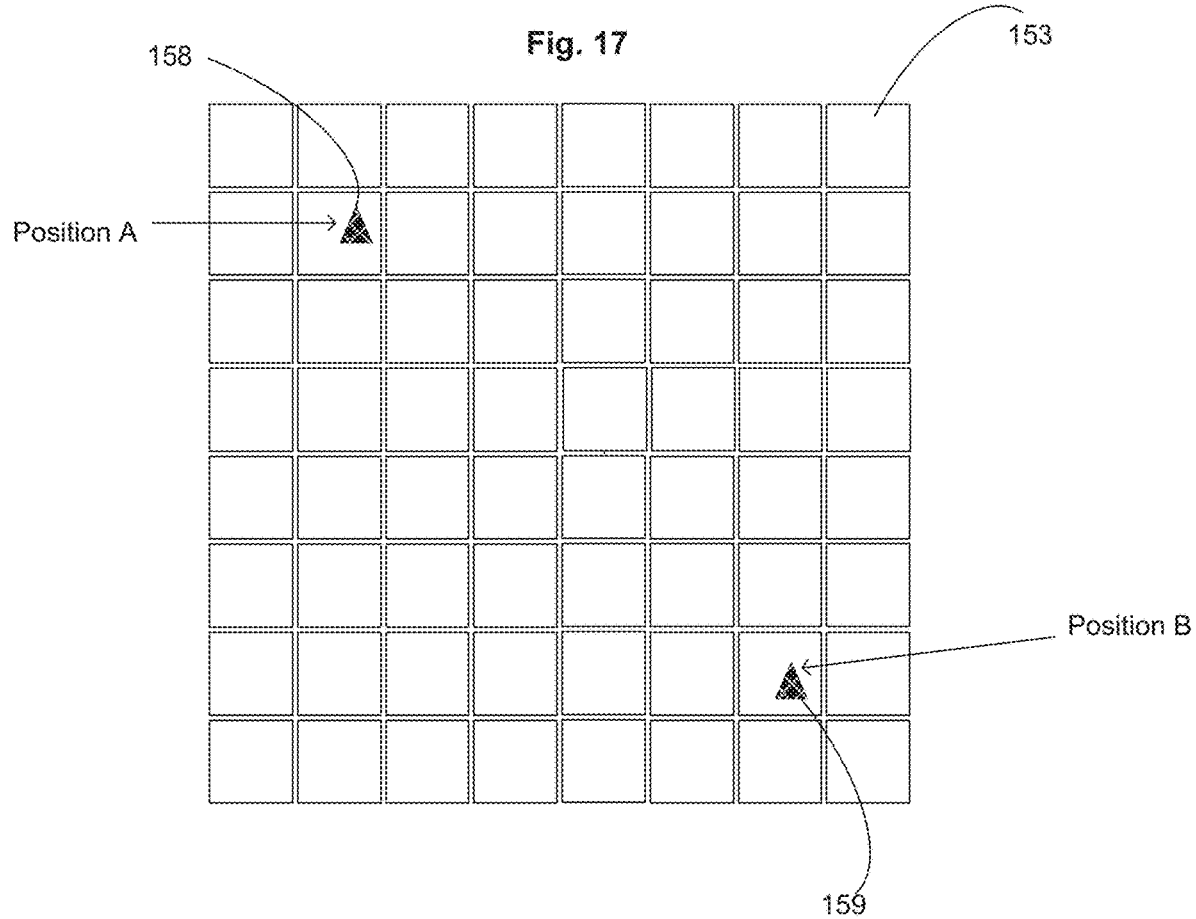

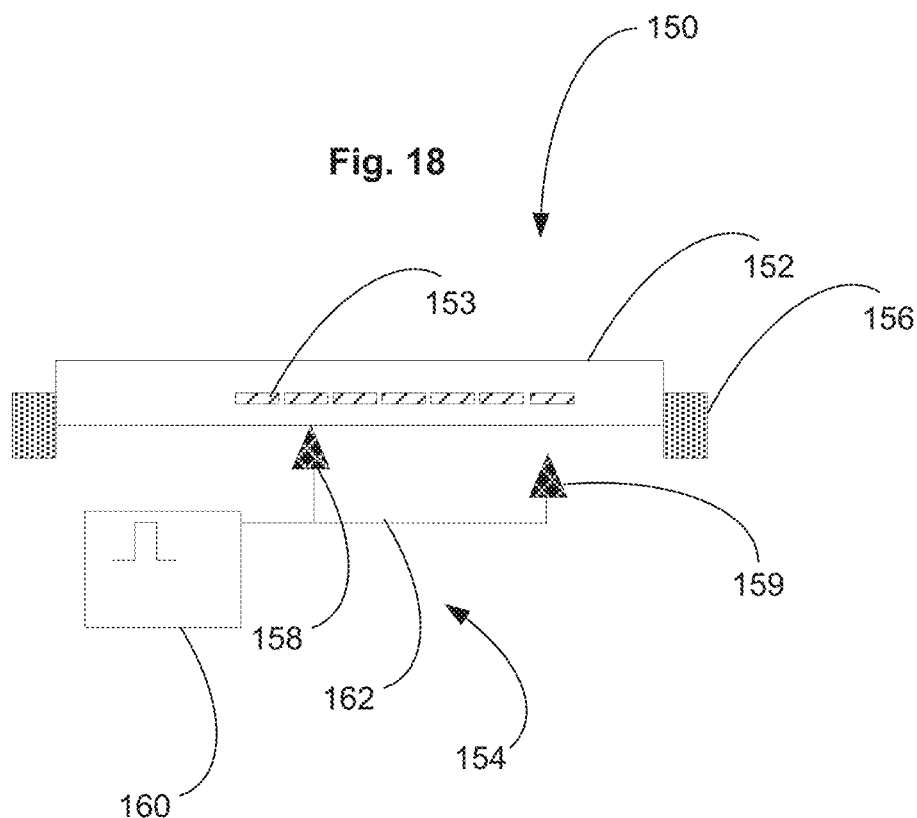
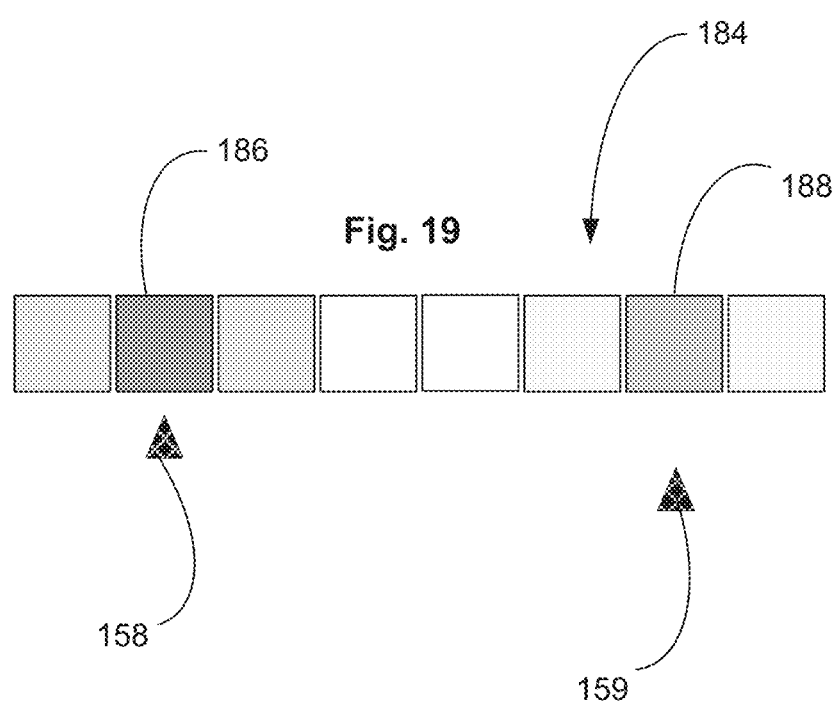

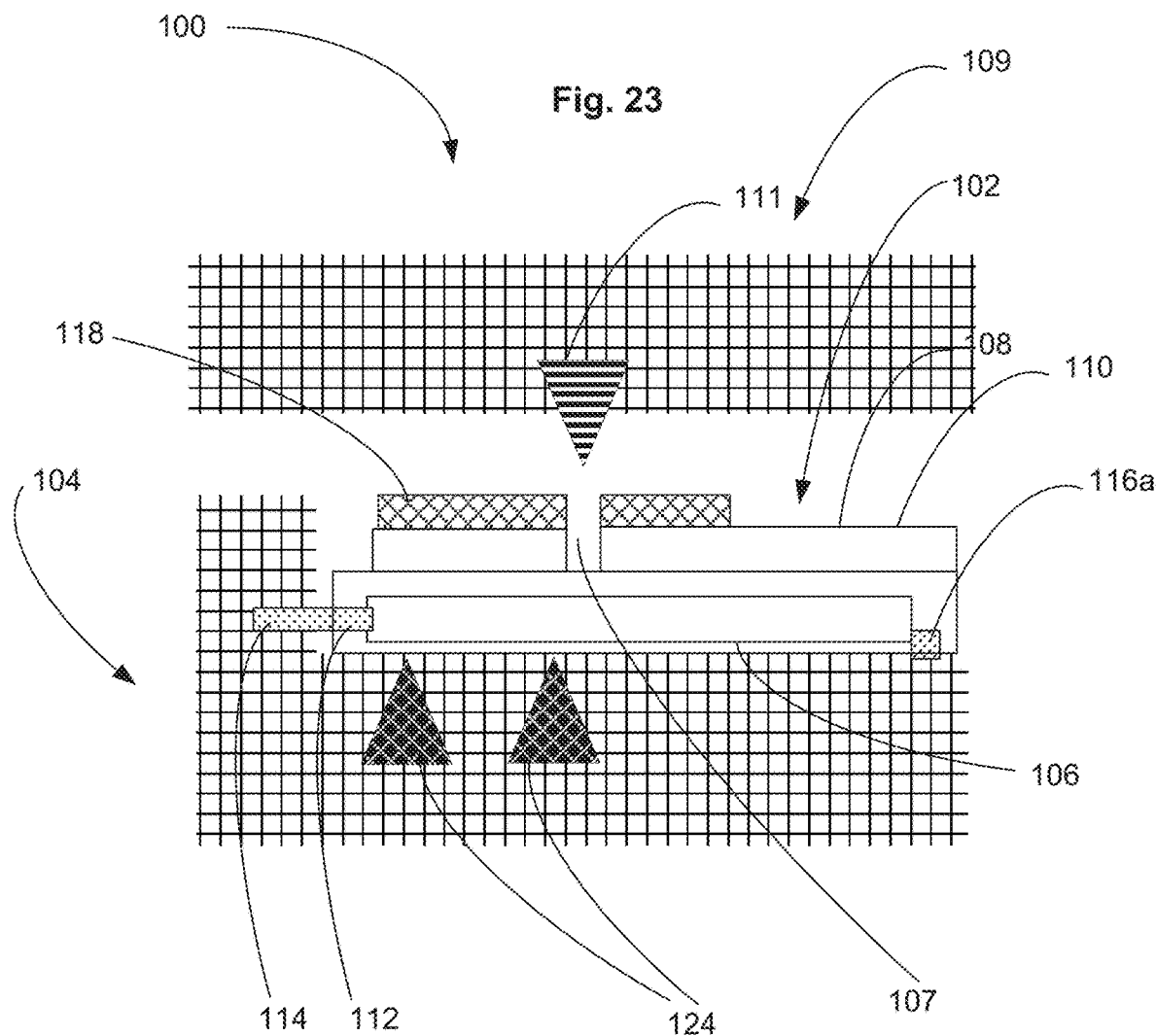

EWOD CARTRIDGE POSITION SENSING WHEN DOCKED IN EWOD INSTRUMENT

TECHNICAL FIELD

The present invention relates to droplet microfluidic devices, and more specifically to Active Matrix Electrowetting-On-Dielectric (AM-EWOD) devices, and to methods of AM-EWOD operation to adjust a reaction protocol or script to account for misalignment of an AM-EWOD cartridge relative to an AM-EWOD instrument.

BACKGROUND ART

Electrowetting on dielectric (EWOD) is a well-known technique for manipulating droplets of fluid by application of an electric field. Active Matrix EWOD (AM-EWOD) refers to implementation of EWOD in an active matrix array incorporating transistors, for example by using thin film transistors (TFTs). It is thus a candidate technology for digital microfluidics for lab-on-a-chip technology. An introduction to the basic principles of the technology can be found in "Digital microfluidics: is a true lab-on-a-chip possible?", R. B. Fair, Microfluid Nanofluid (2007) 3:245-281).

FIG. 1 is a drawing depicting an exemplary EWOD based microfluidic system. In the example of FIG. 1, the microfluidic system includes a reader 32 and a cartridge 34. The cartridge 34 may contain a microfluidic device, such as an AM-EWOD device 36, as well as (not shown) fluid input ports into the device and an electrical connection as are conventional. The fluid input ports may perform the function of inputting fluid into the AM-EWOD device 36 and generating droplets within the device, for example by dispensing from input reservoirs as controlled by electrowetting. As further detailed below, the microfluidic device includes an electrode array configured to receive the inputted fluid droplets.

The microfluidic system further may include a control system configured to control actuation voltages applied to the electrode array of the microfluidic device to perform manipulation operations to the fluid droplets. For example, the reader 32 may contain such a control system configured as control electronics 38 and a storage device 40 that may store any application software and any data associated with the system. The control electronics 38 may include suitable circuitry and/or processing devices that are configured to carry out various control operations relating to control of the AM-EWOD device 36, such as a CPU, microcontroller or microprocessor.

In the example of FIG. 1, an external sensor module 35 is provided for sensor droplet properties. For example, optical sensors as are known in the art may be employed as external sensors for sensing droplet properties, which may be incorporated into a probe that can be located in proximity to the EWOD device. Suitable optical sensors include camera devices, light sensors, charged coupled devices (CCD) and similar image sensors, and the like. A sensor additionally or alternatively may be configured as internal sensor circuitry incorporated as part of the drive circuitry in each array element. Such sensor circuitry may sense droplet properties by the detection of an electrical property at the array element, such as impedance or capacitance.

FIG. 2 is a drawing depicting additional details of the exemplary AM-EWOD device 36 in a perspective view. The AM-EWOD device 36 has a lower substrate assembly 44 with thin film electronics 46 disposed upon the lower substrate assembly 44. The thin film electronics 46 are arranged to drive array element electrodes 48. A plurality of array element electrodes 48 are arranged in an electrode or element two-dimensional array 50, having N rows by M columns of array elements where N and M may be any integer. A liquid droplet 52 which may include any polar liquid and which typically may be aqueous, is enclosed between the lower substrate 44 and a top substrate 54 separated by a spacer 56, although it will be appreciated that multiple liquid droplets 52 can be present.

FIG. 3 is a drawing depicting a cross section through some of the array elements of the exemplary AM-EWOD 36 device of FIG. 2. In the portion of the AM-EWOD device depicted in FIG. 3, the device includes a pair of the array element electrodes 48A and 48B that are shown in cross section that may be utilized in the electrode or element array 50 of the AM-EWOD device 36 of FIG. 3. The AM-EWOD device 36 further incorporates the thin-film electronics 46 disposed on the lower substrate 44, which is separated from the upper substrate 54 by the spacer 56. The uppermost layer of the lower substrate 44 (which may be considered a part of the thin film electronics layer 46) is patterned so that a plurality of the array element electrodes 48 (e.g. specific examples of array element electrodes are 48A and 48B in FIG. 3) are realized. The term element electrode 48 may be taken in what follows to refer both to the physical electrode structure 48 associated with a particular array element, and also to the node of an electrical circuit directly connected to this physical structure. A reference electrode 58 is shown in FIG. 3 disposed upon the top substrate 54, but the reference electrode alternatively may be disposed upon the lower substrate 44 to realize an in-plane reference electrode geometry. The term reference electrode 58 may also be taken in what follows to refer to both or either of the physical electrode structure and also to the node of an electrical circuit directly connected to this physical structure.

In the AM-EWOD device 36, a non-polar fluid 60 (e.g. oil) may be used to occupy the volume not occupied by the liquid droplet 52. An insulator layer 62 may be disposed upon the lower substrate 44 that separates the conductive element electrodes 48A and 48B from a first hydrophobic coating 64 upon which the liquid droplet 52 sits with a contact angle 66 represented by θ. The hydrophobic coating is formed from a hydrophobic material (commonly, but not necessarily, a fluoropolymer). On the top substrate 54 is a second hydrophobic coating 68 with which the liquid droplet 52 may come into contact. The reference electrode 58 is interposed between the top substrate 54 and the second hydrophobic coating 68.

The contact angle θ for the liquid droplet is defined as shown in FIG. 3, and is determined by the balancing of the surface tension components between the solid-liquid ($\gamma_{SL}$), liquid-gas ($\gamma_{LG}$) and non-ionic fluid ($\gamma_{SG}$) interfaces, and in the case where no voltages are applied satisfies Young's law, the equation being given by:

$$\cos\theta = \frac{\gamma_{SG} - \gamma_{SL}}{\gamma_{LG}} \qquad \text{(equation 1)}$$

In operation, voltages termed the EW drive voltages, (e.g. $V_T$, $V_0$ and $V_{00}$ in FIG. 3) may be externally applied to different electrodes (e.g. reference electrode 58, element electrodes 48A and 48B, respectively). The resulting electrical forces that are set up effectively control the hydrophobicity of the hydrophobic coating 64. By arranging for different EW drive voltages (e.g. $V_O$ and $V_{OO}$) to be applied to different element electrodes (e.g. 48A and 48B), the liquid droplet 52 may be moved in the lateral plane between the two substrates.

FIG. 4A shows a circuit representation of the electrical load 70A between the element electrode 48 and the reference electrode 58 in the case when a liquid droplet 52 is present. The liquid droplet 52 can usually be modeled as a resistor and capacitor in parallel. Typically, the resistance of the droplet will be relatively low (e.g. if the droplet contains ions) and the capacitance of the droplet will be relatively high (e.g. because the relative permittivity of polar liquids is relatively high, e.g. ~80 if the liquid droplet is aqueous). In many situations the droplet resistance is relatively small, such that at the frequencies of interest for electrowetting, the liquid droplet 52 may function effectively as an electrical short circuit. The hydrophobic coatings 64 and 68 have electrical characteristics that may be modelled as capacitors, and the insulator 62 may also be modelled as a capacitor. The overall impedance between the element electrode 48 and the reference electrode 58 may be approximated by a capacitor whose value is typically dominated by the contribution of the insulator 62 and hydrophobic coatings 64 and 68 contributions, and which for typical layer thicknesses and materials may be on the order of a pico-Farad in value.

FIG. 4B shows a circuit representation of the electrical load 70B between the element electrode 48 and the reference electrode 58 in the case when no liquid droplet is present. In this case the liquid droplet components are replaced by a capacitor representing the capacitance of the non-polar fluid 60 which occupies the space between the top and lower substrates. In this case the overall impedance between the element electrode 48 and the reference electrode 58 may be approximated by a capacitor whose value is dominated by the capacitance of the non-polar fluid and which is typically small, on the order of femto-Farads.

For the purposes of driving and sensing the array elements, the electrical load 70A/70B overall functions in effect as a capacitor, whose value depends on whether a liquid droplet 52 is present or not at a given element electrode 48. In the case where a droplet is present, the capacitance is relatively high (typically of order pico-Farads), whereas if there is no liquid droplet present the capacitance is low (typically of order femto-Farads). If a droplet partially covers a given electrode 48 then the capacitance may approximately represent the extent of coverage of the element electrode 48 by the liquid droplet 52.

U.S. Pat. No. 7,163,612 (Sterling et al., issued Jan. 16, 2007) describes how TFT based thin film electronics may be used to control the addressing of voltage pulses to an EWOD array by using circuit arrangements very similar to those employed in active matrix display technologies. The approach of U.S. Pat. No. 7,163,612 may be termed "Active Matrix Electrowetting on Dielectric" (AM-EWOD). There are several advantages in using TFT based thin film electronics to control an EWOD array, namely:

Electronic driver circuits can be integrated onto the lower substrate.

TFT-based thin film electronics are well suited to the AM-EWOD application. They are cheap to produce so that relatively large substrate areas can be produced at relatively low cost.

TFTs fabricated in standard processes can be designed to operate at much higher voltages than transistors fabricated in standard CMOS processes. This is significant since many EWOD technologies require electrowetting voltages in excess of 20V to be applied.

FIG. 5 is a drawing depicting an exemplary arrangement of thin film electronics 46 in the exemplary AM-EWOD device 36 of FIG. 2. The thin film electronics 46 is located upon the lower substrate 44. Each array element 51 of the array of elements 50 contains an array element circuit 72 for controlling the electrode potential of a corresponding element electrode 48. Integrated row driver 74 and column driver 76 circuits are also implemented in thin film electronics 46 to supply control signals to the array element circuit 72. The array element circuit 72 may also contain a sensor capability for detecting the presence or absence of a liquid droplet in the location of the array element. Integrated sensor row addressing 78 and column detection circuits 80 may further be implemented in thin film electronics for the addressing and readout of the sensor circuitry in each array element.

A serial interface 82 may also be provided to process a serial input data stream and facilitate the programming of the required voltages to the element electrodes 48 in the array 50. A voltage supply interface 84 provides the corresponding supply voltages, top substrate drive voltages, and other requisite voltage inputs as further described herein. A number of connecting wires 86 between the lower substrate 44 and external control electronics, power supplies and any other components can be made relatively few, even for large array sizes. Optionally, the serial data input may be partially parallelized. For example, if two data input lines are used the first may supply data for columns 1 to X/2, and the second for columns (1+X/2) to M with minor modifications to the column driver circuits 76. In this way the rate at which data can be programmed to the array is increased, which is a standard technique used in liquid crystal display driving circuitry.

FIG. 6 is a drawing depicting an exemplary arrangement of the array element circuit 72 present in each array element 51, which may be used as part of the thin film electronics of FIG. 5. The array element circuit 72 may contain an actuation circuit 88, having inputs ENABLE, DATA and ACTUATE, and an output which is connected to an element electrode 48. The array element circuit 72 also may contain a droplet sensing circuit 90, which may be in electrical communication with the element electrode 48. Typically, the read-out of the droplet sensing circuit 90 may be controlled by one or more addressing lines (e.g. RW) that may be common to elements in the same row of the array, and may also have one or more outputs, e.g. OUT, which may be common to all elements in the same column of the array.

The array element circuit 72 may typically perform the functions of:

(i) Selectively actuating the element electrode 48 by supplying a voltage to the array element electrode. Accordingly, any liquid droplet present at the array element 51 may be actuated or de-actuated by the electro-wetting effect.

(ii) Sensing the presence or absence of a liquid droplet at the location of the array element 51. The means of sensing may be capacitive or impedance, optical, thermal or some other means. Capacitive or impedance sensing may be employed conveniently and effectively using an integrated impedance sensor circuit as part of the array element circuitry.

Various methods of controlling an AM-EWOD device to sense droplets and perform desired droplet manipulations have been described. For example, US 2017/0056887 (Hadwen et al., published Mar. 2, 2017) describes the use of capacitance detection to sense dynamic properties of reagents as a way for determining the output of an assay. Such disclosure incorporates an integrated impedance sensor circuit that is incorporated specifically into the array element circuitry of each array element. Accordingly, attempts have been made to optimize integrated impedance sensing circuitry 90 of FIG. 6 into the array element structure, and in particular as part of the array element circuitry 72. Examples of AM-EWOD devices having integrated actuation and sensing circuits are described, for example, in Applicant's commonly assigned patent documents as follows: U.S. Pat. No. 8,653,832 (Hadwen et al., issued Feb. 18, 2014); US 2018/0078934 (Hadwen et al., published Mar. 22, 2018); US 2017/0076676 (Hadwen, published Mar. 16, 2017); and U.S. Pat. No. 8,173,000 (Hadwen et al., issued May 8, 2012). The enhanced method of operation described in the current application may be employed in connection with any suitable array element circuitry 72 including any suitable integrated impedance sensing circuitry 90.

The above impedance or capacitance sensor element arrays are well-suited for sensing liquid droplets on the element array for the purpose of droplet manipulation operations, but nothing in these disclosures teaches any basis for the sensor arrays to sense objects external to the AM-EWOD cartridge. In the field of touch panel sensor technology, sensing of a remote object such as a stylus can be performed using an active matrix TFT array, as described for example in US 2014/0168539 (Kim et al., published Jun. 19, 2014). Such principles, however, have not been applied in the context of a microfluidic device, such as an AM-EWOD device in particular.

In many AM-EWOD device configurations, a disposable AM-EWOD cartridge that includes the element array and thin film electronics is inserted into a broader AM-EWOD instrument that controls and supplies actuation voltages, reads out sensor information and related output signals, inputs and extracts fluid, and provides the operator interface. It is of significant importance, therefore, that the AM-EWOD cartridge be properly docked into and aligned with the AM-EWOD instrument at a position optimized for the desired reaction protocols or scripts. The AM-EWOD instrument and/or AM-EWOD cartridge typically include docking features, but such features may only provide a relatively gross positioning of the AM-EWOD cartridge relative to pertinent AM-EWOD instrument components. For many applications, a high precision of mechanical alignment is required or beneficial, as pixel size of the individual array elements may be on the order of 0.2 mm or less. In some AM-EWOD cartridges, pixel size may be on the order of 0.1 mm or 0.05 mm, which requires even higher alignment precision. As one example, the requirement for precise cartridge alignment can relate to the alignment of instrument magnets located in the AM-EWOD instrument relative to the electrode array, such as for example in connection with magnetic bead-based washing operations. High precision alignment of the magnets relative to the electrode array is required for bead-based washing to be reliable and effective. In addition to alignment to the magnets, as another example cartridge alignment to optical and/or thermal components in the AM-EWOD instrument also may be important.

Precise mechanical cartridge alignment, however, particularly for the smaller ranges of array element (pixel) sizes, may be difficult to achieve given the cumulative tolerance stack of the mechanical components. For example, tolerance contributions from glass cutting of the cartridge substrates, alignment of the glass substrates within the plastic housing of the AM-EWOD instrument, alignment of instrument magnets relative to mechanical docking features for the cartridge, and the like can combine to accumulate an overall tolerance range that may not preclude significant misalignment for certain high-precision applications. Conventional configurations do not address the potential for such misalignment of the AM-EWOD cartridge relative to the AM-EWOD instrument components.

SUMMARY OF INVENTION

There is a need in the art, therefore, for an improved system and method for AM-EWOD device operation that can account for a mechanical tolerance range that may not be suitable for certain high-precision device operations. The present invention addresses such deficiencies of conventional configurations by sensing components of the AM-EWOD instrument that are external to the AM-EWOD cartridge, and modifying a reaction protocol or script of droplet manipulations in a manner that accounts for mechanical tolerances of the AM-EWOD system. To achieve such result, sensor circuitry within the array element circuitry of the array elements can perform dual functions of both sensing liquid droplets that are positioned internally within the AM-EWOD cartridge, and sensing external locators that may be positioned within the broader AM-EWOD instrument but external to the AM-EWOD cartridge. Outputs from the sensor circuitry may be used for adjusting the position of droplet manipulation operations as part of the reaction protocol or script to account for mechanical misalignment within the AM-EWOD system, and particularly misalignment of the AM-EWOD cartridge relative to components of the AM-EWOD instrument.

As referenced above, each AM-EWOD array element contains an impedance or capacitance sensor function integrated into the array element circuitry. Typically, this sensing circuitry is used for sensing droplet position in relation to droplet manipulation operations, but in accordance with embodiments of the present invention, the sensing circuity also is configured to sense the position of a conductive locator positioned within the AM-EWOD instrument, when such locator is brought close to, or into contact with, the outer surfaces of the glass substrates of the AM-EWOD cartridge. For example, the conductive locator may be one of the magnets in the instrument used for magnetic bead-based washing. The conductivity of the locator needs only to be sufficient to conduct electrical signals through the locator to perform the described sensing function. Because the electrical current conducted through the locator in the described embodiments is small, the locator only needs to be slightly conductive, for example having a resistance of 1 Mohm or less.

In an exemplary embodiment, a voltage signal is applied to a magnet element in the instrument. A sensor image is generated based on the outputs of the array element sensing circuitry, and the sensor image shows the transduced position of the magnet element. In an alternative embodiment, a passive arrangement may be implemented in which there is no electrical signal applied to the locator, whereby highly sensitive sensing circuity is capable of detecting the locator without application of a voltage signal to the locator.

The sensing circuitry of the array elements is thus capable of detecting the position of locators within the AM-EWOD instrument, for example the instrument magnets referenced above, relative to the electrode array. Two or more locator points may be detected to account for rotational as well as translational misalignment within a plane of the element array. The misalignment is determined by the AM-EWOD control system, and based on the extent of misalignment, the control system may compensate for the misalignment by adjusting the reaction protocol or script. For example, the control system may control actuation voltages to nudge or slightly move the centroid of a droplet relative to an array element so the centroid becomes optimally located relative to the instrument magnet or other desired instrument component.

An advantage of the present invention is that accounting for misalignment by adjusting the reaction protocol or script relaxes the mechanical tolerance requirements on cartridge/instrument alignment, which may make the cartridge and/or instrument easier and cheaper to produce. A further advantage is that the efficacy of the wash operation or other droplet operations may be improved by more accurate alignment by precise droplet position adjustments, which may reduce the volume of supernatant fluid surrounding a bead pellet, or otherwise may reduce the amounts of sample or reagent fluids that are required for a reaction protocol.

An aspect of the invention, therefore, is a microfluidic system and related method of operation that accounts for misalignment of an AM-EWOD cartridge relative to a microfluidic instrument (i.e. an instrument that controls the microfluidic cartridge) by determining a position of a locator component of the microfluidic instrument, and modifying a reaction protocol or script of droplet manipulation operations in a manner that compensates for the misalignment. In exemplary embodiments, the microfluidic system includes: an electro-wetting on dielectric (EWOD) cartridge comprising an element array configured to receive liquid droplets, the element array comprising a plurality of individual array elements each including array element circuity comprising sensing circuitry that is integrated into the array element circuitry; a microfluidic instrument that is configured to receive the EWOD cartridge and having an electrically conductive locator that is external to the EWOD cartridge; and a control system configured perform electrowetting operations by controlling actuation voltages applied to the element array to perform manipulation operations as to liquid droplets present on the element array. The control system further is configured to: read an output from the sensing circuitry, determine a position of the locator relative to the element array based on the output, and determine a misalignment of the EWOD cartridge relative to the microfluidic instrument based on the position of the locator. The microfluidic system further may include a voltage supply that applies a voltage perturbation to the locator, and the control system reads the output from the sensing circuitry in response to the voltage perturbation applied to the locator. The control system further may be configured to adjust a droplet manipulation operation to compensate for the determined misalignment. The control system may perform such operations by executing program code stored on a non-transitory computer readable medium.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

BRIEF DESCRIPTION OF DRAWINGS

FIG. 3 is a drawing depicting a cross section through some of the array elements of the exemplary AM-EWOD device of FIG. 2.

FIG. 4A is a drawing depicting a circuit representation of the electrical load presented at the element electrode when a liquid droplet is present.

FIG. 4B is a drawing depicting a circuit representation of the electrical load presented at the element electrode when no liquid droplet is present.

FIG. 5 is a drawing depicting an exemplary arrangement of thin film electronics in the exemplary AM-EWOD device of FIG. 2.

FIG. 10 is a drawing depicting an exemplary washing operation with bead separation based on the use of instrument magnets.

FIG. 13 is a timing diagram for operation of the circuitry of FIG. 12 to sense a locator in accordance with embodiments of the present invention.

FIG. 16 is a drawing depicting a variation on the embodiment of FIG. 11, in which the exemplary portion of the AM-EWOD cartridge is positioned in relation to multiple locators of a microfluidic instrument.

FIG. 17 is a drawing depicting a top view of the array of element electrodes of FIG. 16 in relation to the locators.

FIG. 18 is a drawing depicting a variation on the embodiment of FIGS. 11 and 16, in which the exemplary portion of the AM-EWOD cartridge is positioned in relation to multiple locators and the locators may be positioned at different distances relative to the element array.

FIG. 19 is a drawing depicting an output image that is derived from output currents measured from the element array as shown in FIG. 18.

FIG. 23 is a schematic drawing depicting a variation on the exemplary microfluidic system of FIG. 22, wherein the microfluidic instrument includes an optical instrument.

DESCRIPTION OF EMBODIMENTS

Figure 1:
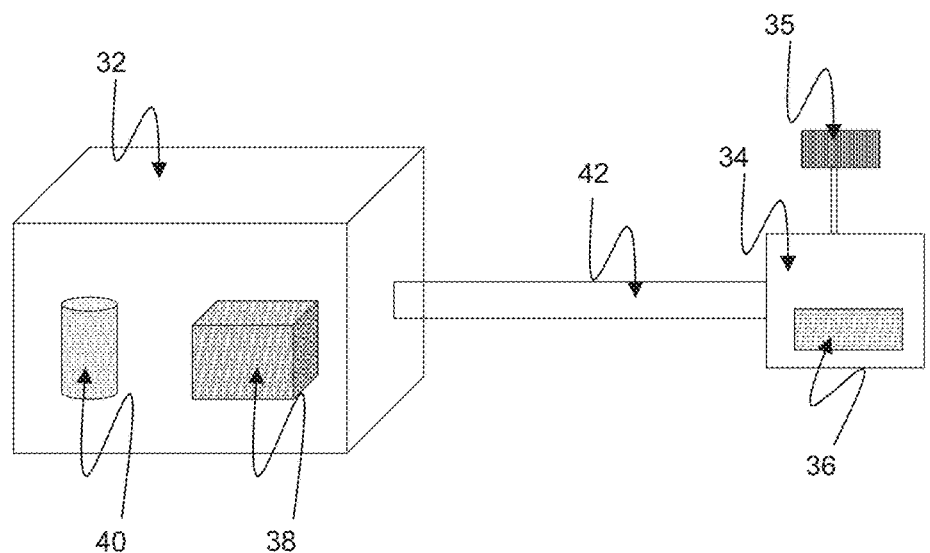
FIG. 1 is a drawing depicting an exemplary EWOD based microfluidic system.
Figure 2:
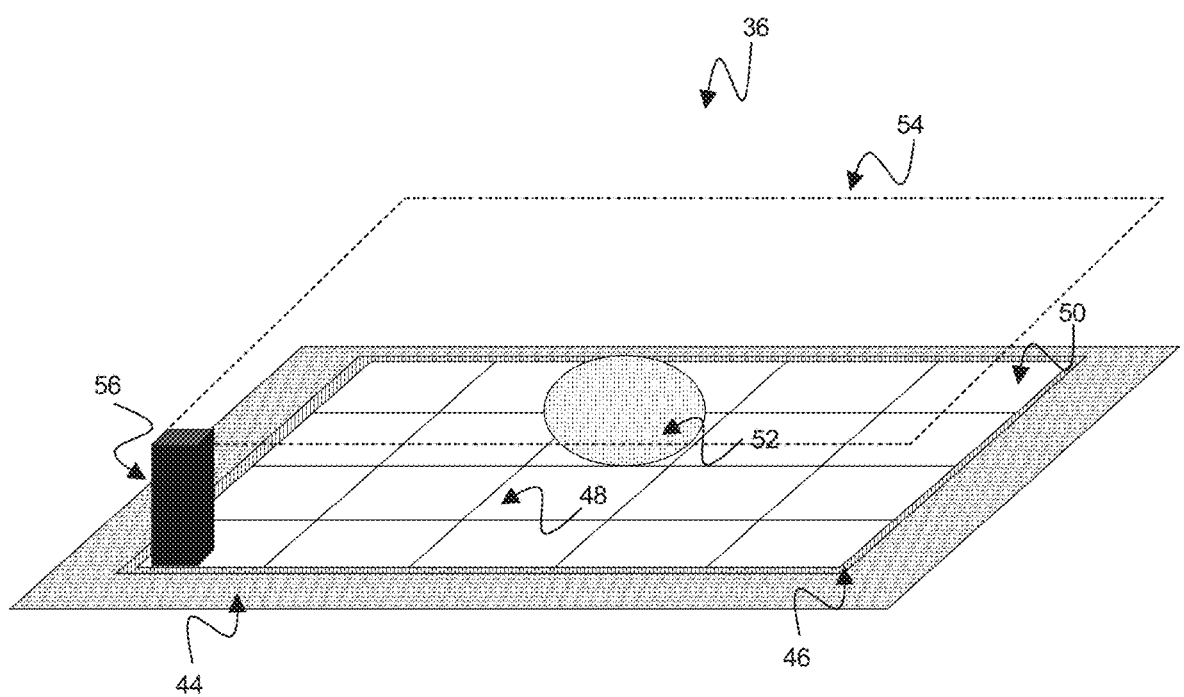
FIG. 2 is a drawing depicting an exemplary AM-EWOD device in a perspective view.
Figure 6:
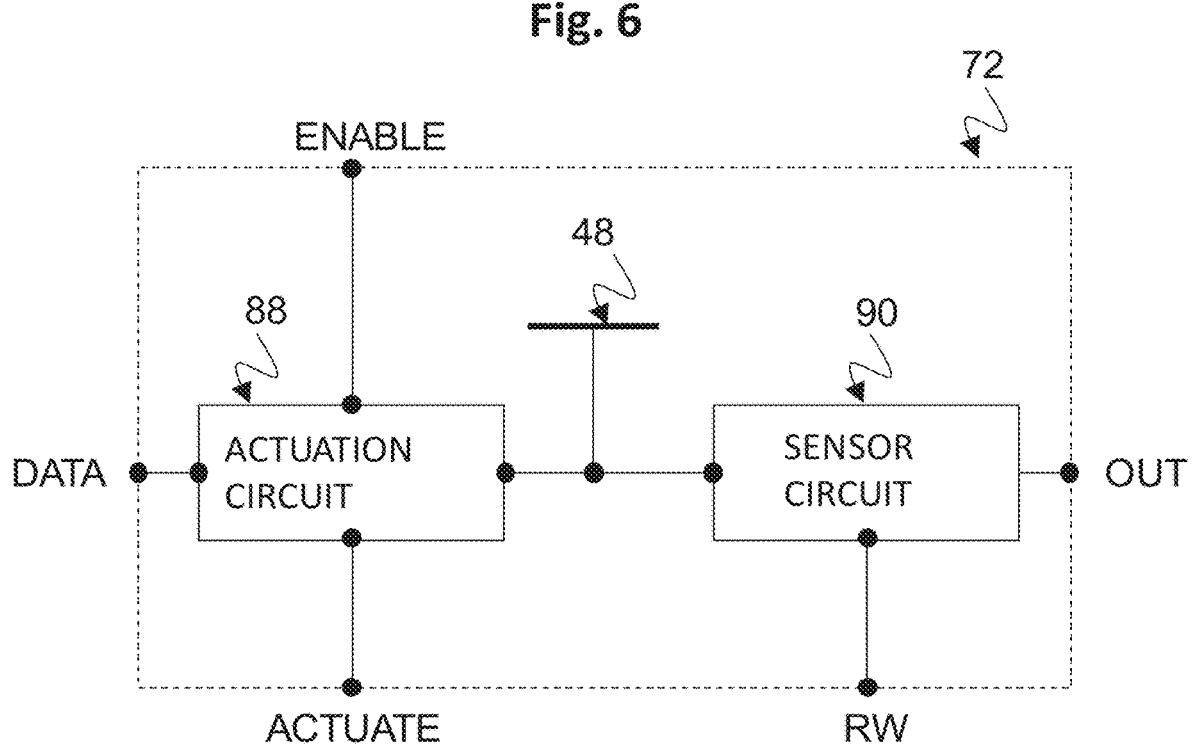
FIG. 6 is a drawing depicting exemplary array element circuitry for an AM-EWOD device.

Embodiments of the present invention will now be described with reference to the drawings, wherein like reference numerals are used to refer to like elements throughout. It will be understood that the figures are not necessarily to scale.

The present invention pertains to an improved system and method for AM-EWOD device operation that can account for component misalignment from a mechanical tolerance range that may not be suitable for certain high-precision device operations. The present invention operates by sensing components of the AM-EWOD instrument that are external to the AM-EWOD cartridge, and modifying a reaction protocol or script of droplet manipulations in a manner that accounts for mechanical tolerances of the AM-EWOD system. To achieve such result, sensor circuitry within the array element circuitry of the array elements can perform dual functions of both sensing liquid droplets that are positioned internally within the AM-EWOD cartridge, and sensing external locators that may be positioned within the broader AM-EWOD instrument but external to the AM-EWOD cartridge. Outputs from the sensor circuitry may be used for adjusting the position of droplet manipulation operations as part of the reaction protocol or script to account for mechanical misalignment within the AM-EWOD system, and particularly misalignment of the AM-EWOD cartridge relative to components of the AM-EWOD instrument.

The sensing circuitry of the array elements is thus capable of detecting the position of locators within the AM-EWOD instrument, for example the instrument magnets referenced above, relative to the electrode array. Two or more locator points may be detected to account for rotational as well as translational misalignment within a plane of the element array. The misalignment is determined by the AM-EWOD control system, and based on the extent of misalignment, the control system may compensate for the misalignment by adjusting the reaction protocol or script. For example, the control system may control actuation voltages to nudge or slightly move the centroid of a droplet relative to an array element so the centroid becomes optimally located relative to the instrument magnet or other desired instrument component.

Figure 7:
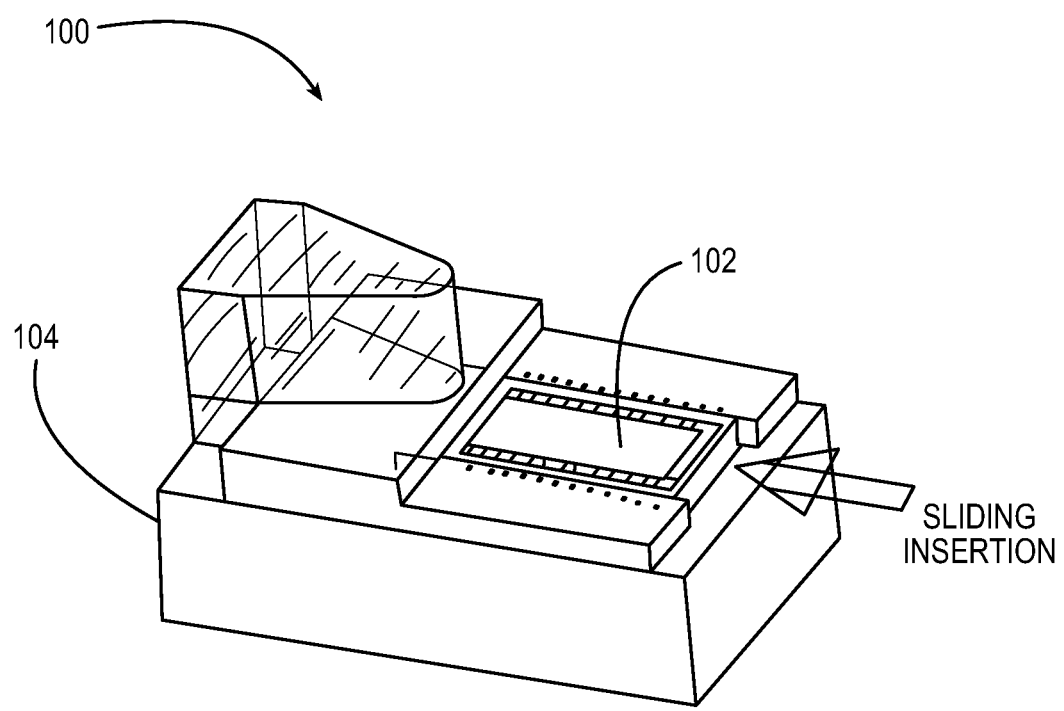
FIG. 7 is a drawing depicting a perspective view of an exemplary AM-EWOD based microfluidic system in accordance with embodiments of the present invention.
Figure 8:
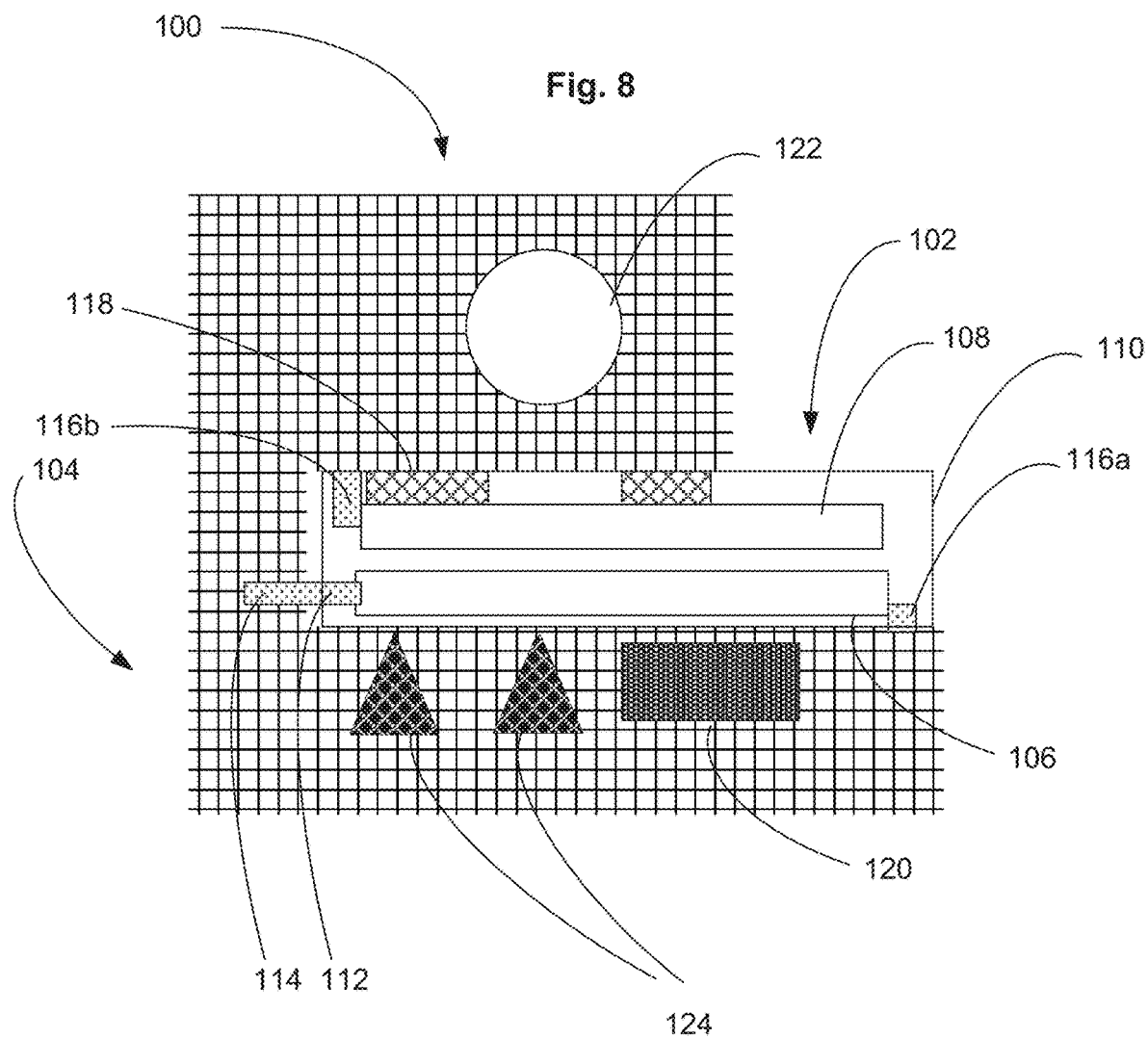
FIG. 8 is a drawing depicting a cross-sectional view of the microfluidic system of FIG. 7.

FIG. 7 is a drawing depicting a perspective view of an exemplary AM-EWOD based microfluidic system 100 in accordance with embodiments of the present invention. FIG. 8 is a schematic drawing depicting a cross-sectional view of the microfluidic system 100 of FIG. 7. The microfluidic system 100 includes a microfluidic cartridge 102, which typically is disposable and intended for one-time use, and a microfluidic instrument 104 into which the microfluidic cartridge 102 is docked. As used herein, the term microfluidic instrument generally refers to a control device or control unit that controls the microfluidic cartridge. The microfluidic cartridge 102 is configured for EWOD or AM-EWOD operation and thus typically includes a thin film transistor (TFT) glass substrate 106, a top substrate 108, and a plastic housing 110 into which the glass substrates are embedded. The plastic housing may incorporate adhesives for securing the components in place, and internal spacer elements for spacing and sealing the two glass substrates. The microfluidic cartridge 102 also includes a first electrical connector 112 for mating to the microfluidic instrument 104 in a manner that permits electrical signals to be exchanged between the microfluidic cartridge 102 and the microfluidic instrument 104. As referenced above, the microfluidic cartridge 102 is configured for EWOD or AM-EWOD operation, and thus the TFT substrate 106 and related components may include array elements, array element circuitry, and control signal lines as described above with reference to FIGS. 1-6.

The microfluidic instrument 104 is configured to receive the microfluidic cartridge 102 and is designed to make insertion and removal of a microfluidic cartridge straightforward for the user. The microfluidic instrument 104 includes a second electrical connector 114 that mates with the first electrical connector 112 to permit the electrical signals to be exchanged between the microfluidic cartridge 102 and the microfluidic instrument 104. The microfluidic instrument 104 further includes docking features 116a and 116b for mechanically supporting and positioning the microfluidic cartridge 102 during insertion and removal. The docking features may interact with housing features 118 of the microfluidic cartridge 102 to aid in the insertion, removal, and positioning of the microfluidic cartridge 102 within the microfluidic instrument 104. It will be appreciated that any suitable configuration of docking features and cooperating housing features may be employed. Docking may be achieved by sliding insertion, clamping, or any other mechanical means suitable for positioning the microfluidic cartridge within the instrument.

The microfluidic instrument 104 may have a benchtop format, that for example is designed for use in an analytical laboratory. The microfluidic instrument 104 also may be miniaturized into a hand-held format that for example is appropriate for point-of-care applications in medical treatment facilities. The microfluidic instrument 104 includes components that permit control of the microfluidic cartridge 102 to perform a variety of chemical and biochemical reaction protocols and scripts by AM-EWOD operation. The microfluidic instrument 104, therefore, may include the following components: control electronics for supplying voltage supplies and timing signals for controlling actuation and de-actuation of the AM-EWOD array elements; heater elements 120 for heating portions of the AM-EWOD array elements to control the temperature of the liquid droplets, which is desired or required for certain reaction protocols; optical components or sensors 122 that measure optical properties of droplets on the AM-EWOD element array; magnet elements 124 for applying magnetic fields to the liquid droplets and the AM-EWOD element array; and features for liquid input or extraction, such as for example pipettes incorporated into the microfluidic instrument. The optical components 122 may include both light sources, such as for example light-emitting diodes (LEDs) or laser diodes, for illuminating liquid droplets, and also detection elements, such as for example photodiodes or other image sensors for detecting the optical signals returned from the liquid droplet. Optical measurements of liquid droplets may employ sensing techniques such as absorbance, fluorescence, chemiluminescence, and the like. As to the magnets 124, many reaction protocols employ the use of magnetic beads within liquid droplets to perform purification or "washing" steps. By using magnetic fields applied from magnets in the microfluidic instrument, magnetic beads may be clumped together or released and be moved through the body of the liquid droplet to perform such washing steps.

The microfluidic cartridge 102 includes a two-dimensional active matrix array of array elements having electrodes on which the droplets are manipulated, such as described above with respect to FIGS. 1-6. Actuation patterns applied to individual electrodes are controlled to perform various droplet manipulations as described above in connection with FIGS. 1-6. Typical electrode widths are 200 um, 100 um, or may be as small as 50 um. The liquid droplets may be of corresponding size and may be positioned in x-y space to array-element size precision for performing droplet manipulation operations.

Figure 9:
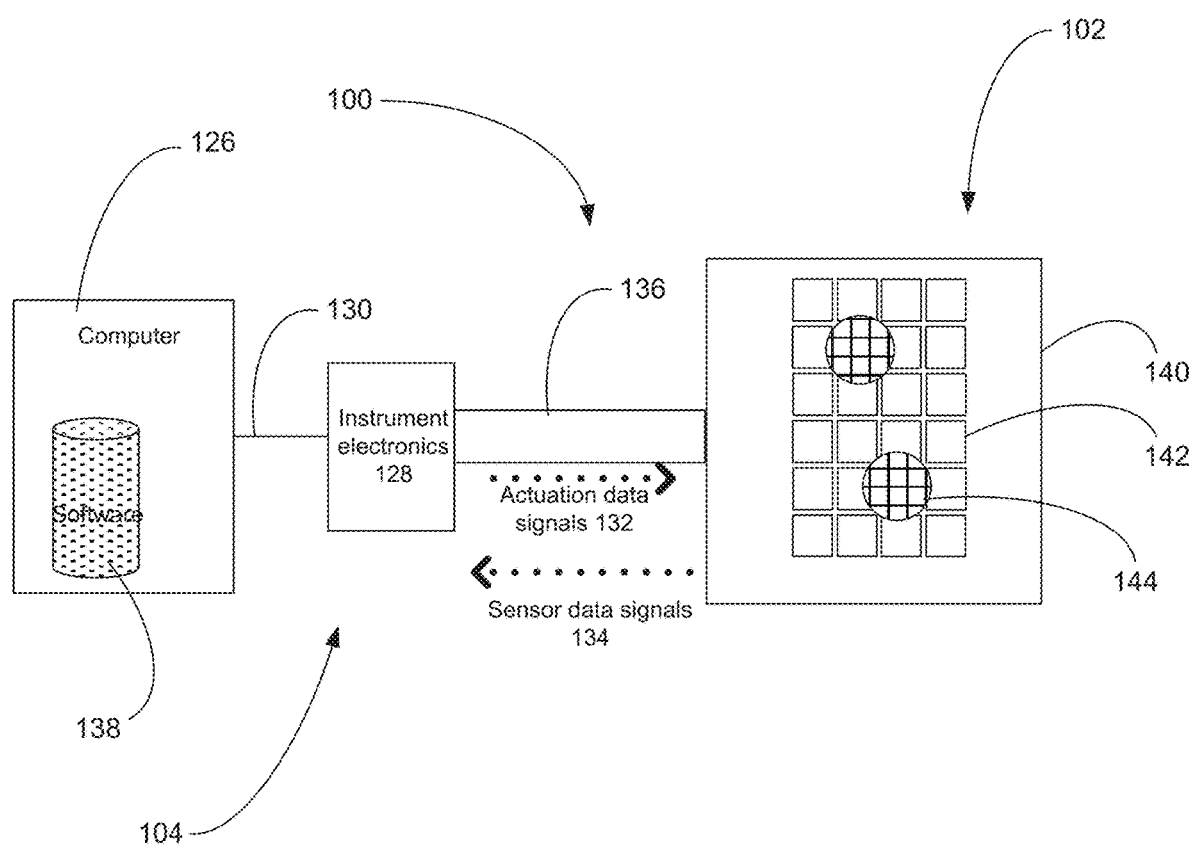
FIG. 9 is a drawing depicting a block diagram of operative portions of the exemplary microfluidic system of FIGS. 7 and 8.

FIG. 9 is a drawing depicting a block diagram of operative portions of the exemplary microfluidic system 100 of FIGS. 7 and 8. Similarly as described with respect to FIG. 1, the microfluidic instrument 104 may include a computer-based control system 126 that controls instrument electronics 128 via a data link 130. Under such control, the instrument electronics supplies actuation data signals 132, and reads out sensor data signals 134, via an instrument/cartridge electrical connector interface 136 (e.g., including the electrical connectors 112 and 114 of FIG. 8). The control system 126 may include a storage device 138 that may store any application software and any data associated with the system. The control system 126 and instrument electronics 128 may include suitable circuitry and/or processing devices that are configured to carry out various control operations relating to control of the microfluidic cartridge 102, such as a CPU, microcontroller or microprocessor. The microfluidic cartridge 102 includes an element array 140 of individual array elements 142 comparably as described above, upon which liquid droplets 144 may be dispensed to perform droplet manipulation operations by actuating and de-actuating one or more array elements in accordance with the actuation data signals 132. The sensor data signals 134 further may be outputted by circuitry of the microfluidic cartridge 102 to the instrument electronics 128.

Accordingly, the control system 126 may execute program code embodied as a control application stored within the storage device 138. It will be apparent to a person having ordinary skill in the art of computer programming, and specifically in application programming for electronic control devices, how to program the control system to operate and carry out logical functions associated with the stored control application. Accordingly, details as to specific programming code have been left out for the sake of brevity. The storage device 138 may be configured as a non-transitory computer readable medium, such as a random access memory (RAM), a read-only memory (ROM), an erasable programmable read-only memory (EPROM or Flash memory), or any other suitable medium. Also, while the code may be executed by control system 126 in accordance with an exemplary embodiment, such control system functionality could also be carried out via dedicated hardware, firmware, software, or combinations thereof, without departing from the scope of the invention.

The control system may be configured to perform some or all of the following functions:
Define the appropriate timing signals to manipulate liquid droplets on the AM-EWOD cartridge element array.
Interpret input data representative of sensor information measured by a sensor or sensor circuitry associated with the AM-EWOD cartridge, including computing the locations, sizes, centroids, perimeters, and particle constituents of liquid droplets on the AM-EWOD element array.
Use calculated sensor data to define the appropriate timing signals to manipulate liquid droplets on the AM-EWOD cartridge, i.e. acting in a feedback mode.
Provide for implementation of a graphical user interface (GUI) whereby the user may program commands such as droplet operations (e.g. move a droplet), assay operations (e.g. perform an assay), and the GUI may report the results of such operations to the user.

The control system 126, such as via the instrument electronics 128, may supply and control the actuation voltages applied to the electrode array of the microfluidic cartridge 102, such as required voltage and timing signals to perform droplet manipulation operations and sense liquid droplets on the AM-EWOD element array. The control system further may execute the application software to generate and output control voltages for droplet sensing and performing sensing operations.

The various methods described herein pertaining to enhanced microfluidic operation may be performed using AM-EWOD structures and devices described with respect to FIGS. 1-6, including for example any control electronics and circuitry, sensing capabilities, and control systems including any processing device that executes computer application code stored on a non-transitory computer readable medium. A reaction protocol including series and/or parallel combinations of droplet manipulation operations are typically conducted in accordance with software instructions that form a script, which may include a script specific to the particular reaction protocol being executed by the droplets. The reaction protocol also is typically conducted using feedback, whereby information from the sensors of droplet sizes and droplet positions is fed back to the software, and the sequence of droplet manipulation operations in time and/or space is adjusted.

To achieve high precision in droplet manipulation operations requiring interaction with the microfluidic instrument components, such as the magnets, optical components, or heaters, it is necessary for the microfluidic cartridge to be well aligned within the microfluidic instrument. Accordingly, the magnets, heaters, or optical components need to be reliably and reproducibly positioned with respect to the array of element electrodes, so that typically an instrument feature (e.g. position of a magnet) is co-located to within one pixel precision relative to a liquid droplet. As referenced above, however, precise mechanical cartridge alignment, particularly for the smaller ranges of array element (pixel) sizes, may be difficult to achieve given the cumulative tolerance stack of the mechanical components. For example, tolerance contributions from glass cutting of the cartridge substrates, alignment of the glass substrates within the plastic housing of the AM-EWOD instrument, alignment of instrument magnets relative to mechanical docking features for the cartridge, and the like can combine to accumulate an overall tolerance range that may not preclude significant misalignment for certain high-precision applications.

The need for precise alignment may be particularly important with relation to the microfluidic instrument magnets. Magnetic bead-based operations, such as for example droplet washing operations, require the actuation patterns aligned with the array element electrodes to be correlated with the magnet positions so as to achieve the best results. An example of such a washing method is described in Applicant's U.S. Pat. No. 9,492,824 (Jacobs et al., issued Nov. 15, 2017). Droplets are manipulated into precise shapes and magnetic beads are moved through a narrow neck formed in the liquid droplet. If the magnets are misaligned relative to the liquid droplet, the washing operation may not be successful. High precision alignment becomes even more significant for reaction protocols, and in particular washing operations, using relatively small droplets, such as for example of diameter on the order of one array element (pixel).

For example, FIG. 10 is a drawing depicting an exemplary washing operation with bead separation based on the use of instrument magnets. In this example, a liquid droplet 144 is dispensed onto the element array 140 of individual array elements 142. Magnetic beads are incorporated into the liquid droplet 144, which form a magnetic bead clump 146 under the magnetic field generated by one or more instrument magnets (not shown). As shown in the progression of the portions of FIG. 10, due to the magnet position relative to the liquid droplet 144, following the washing process a separation operation can be performed whereby the clumped magnetic beads 146 is split away from the liquid droplet 144. As seen in the progression of FIG. 10, the droplet 144 containing the magnetic beads 146 is moved as indicated by the arrow in the figure by electrowetting forces across the element array 140. A region of high magnetic field is created by positioning an instrument magnet close the element array. The magnetic beads within the liquid droplet clump together as shown in the region of a high magnetic field gradient. By continuing to move the droplet, a split occurs with the magnetic beads 146 (and a small surrounding shell of liquid) becoming separated from the liquid droplet 144. In this example, if the instrument magnet is misaligned relative to the position and movement of the liquid droplet, the separation operation does not work as intended as shown in FIG. 10.

The present invention enhances the implementation of droplet manipulation operations on the AM-EWOD element array of the microfluidic cartridge. This is achieved by ensuring the manipulation operations are performed at a position on the element array that is optimally aligned to a component of the microfluidic instrument. Embodiments of the enhanced system and method operate to measure the alignment of the microfluidic cartridge relative to the microfluidic instrument based on the position of a locator component of the microfluidic instrument, and adjust the software reaction protocol or script to control the position of the liquid droplet manipulation operations accordingly.

An aspect of the invention, therefore, is a microfluidic system and related method of operation that accounts for misalignment of an AM-EWOD cartridge relative to a microfluidic instrument by determining a position of a locator component of the microfluidic instrument, and modifying a reaction protocol or script of droplet manipulation operations in a manner that compensates for the misalignment. In exemplary embodiments, the microfluidic system includes: an electro-wetting on dielectric (EWOD) cartridge comprising an element array configured to receive liquid droplets, the element array comprising a plurality of individual array elements each including array element circuitry comprising sensing circuitry that is integrated into the array element circuitry; a microfluidic instrument that is configured to receive the EWOD cartridge and having an electrically conductive locator that is external to the EWOD cartridge; and a control system configured perform electrowetting operations by controlling actuation voltages applied to the element array to perform manipulation operations as to liquid droplets present on the element array. The control system further is configured to: read an output from the sensing circuitry, determine a position of the locator relative to the element array based on the output, and determine a misalignment of the EWOD cartridge relative to the microfluidic instrument based on the position of the locator. The microfluidic system further may include a voltage supply that applies a voltage perturbation to the locator, and the control system reads the output from the sensing circuitry in response to the voltage perturbation applied to the locator. The control system further may be configured to adjust a droplet manipulation operation to compensate for the determined misalignment. The control system may perform such operations by executing program code stored on a non-transitory computer readable medium.

Figure 11:
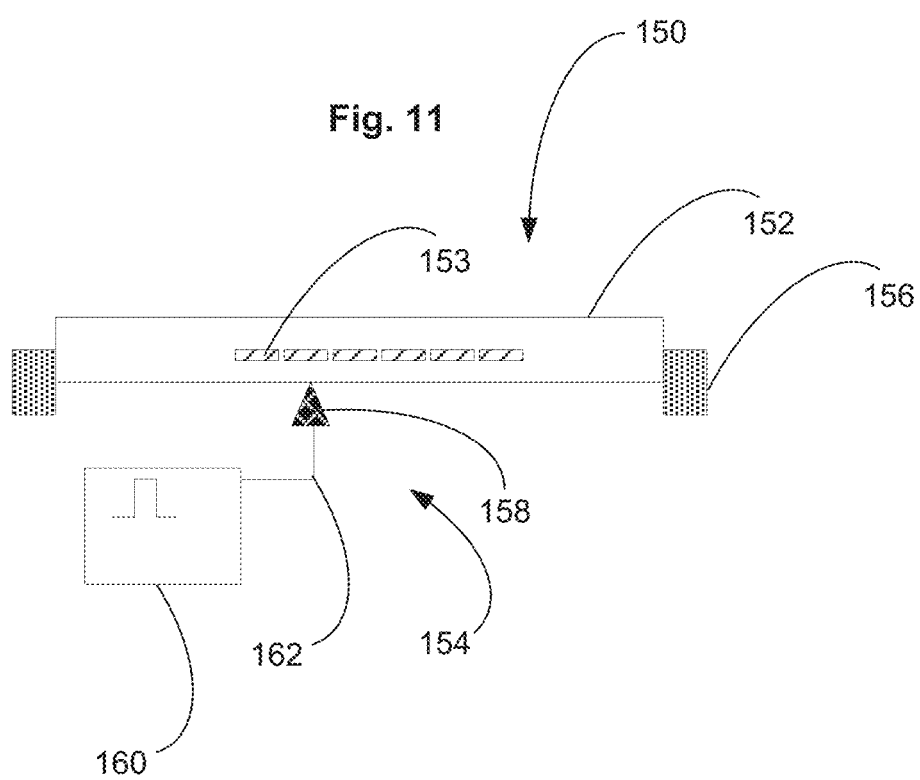
FIG. 11 is a drawing depicting a portion of an exemplary microfluidic system in accordance with embodiments of the present invention.

FIG. 11 is a cross-sectional schematic drawing depicting a portion of an exemplary microfluidic system 150 in accordance with embodiments of the present invention. The microfluidic system 150 includes a microfluidic cartridge 152 having an element array 153 that is inserted into a microfluidic instrument 154 as previously described. For simplicity, instrument docking features 156 are shown with other instrument components being omitted from the figure for illustration purposes. In this exemplary embodiment, the microfluidic instrument 154 includes a conductive locator 158 to which an electrical signal is applied by a voltage supply 160 via any suitable electrical connection 162. The conductive locator 158 is positioned, or can be moved within the microfluidic instrument so as to be positioned, within close proximity to or touching the lower surface of the microfluidic cartridge 152 corresponding to the TFT substrate.

The locator 158 may be an existing feature in the microfluidic instrument 154, for example a magnet, optical component, heater, or the like. In a preferred implementation, accurate results are best achieved when the locator 158 is the same instrument component as to which precise alignment is desired to perform a droplet manipulation operation, e.g., an instrument magnet for a washing operation, a heater for a temperature-controlled reaction step, an optical component for an optical illumination or optical sensing operation, and so on. Accordingly, the locator 158 is a component of the microfluidic instrument 154 that is external from the microfluidic cartridge 152. In addition, different instrument components potentially may act as a locator, with the specific locator being selected by the control system from among the potential locators depending upon the operation to be performed at a given point or step in a reaction protocol or script.

In operation, the microfluidic cartridge 152 is inserted into the microfluidic instrument 154 at an inserted position relative to the locator 158, as for example may be dictated by the instrument docking features 156. As referenced above, each array element in the element array 153 has integrated impedance or capacitance sensing circuitry that is integrated into the array element circuitry. During droplet manipulation operations, the sensing circuitry is used for sensing droplet position, and in accordance with embodiments of the present invention the sensing circuitry also is configured to sense the position of the locator 158 when such locator is brought close to, or into contact with, the outer surface of one of the glass substrates of the AM-EWOD cartridge 152 as positioned within the microfluidic instrument 154. In this embodiment, a voltage signal is applied to the locator 158 by the electrically connected voltage supply 160. Based on output signals from the sensing circuitry of the associated array elements, a sensor image is read out by the instrument electronics and control system, which shows the transduced position of the locator 158 relative to the element array 153 of the microfluidic cartridge 152. A misalignment is determined by the control system analysis of the sensor image. Typically, two or more locator points may be detected to account for rotational as well as two-dimensional translational misalignment along the element array. Based on the extent and nature of any misalignment, the control system compensates for the misalignment by adjusting the reaction protocol or script. For example, the control system may control actuation voltages to nudge or slightly move the centroid of a liquid droplet relative to the element array so the centroid becomes optimally located relative to the conductive locator in the microfluidic instrument for performing the desired operation.

Figure 12:
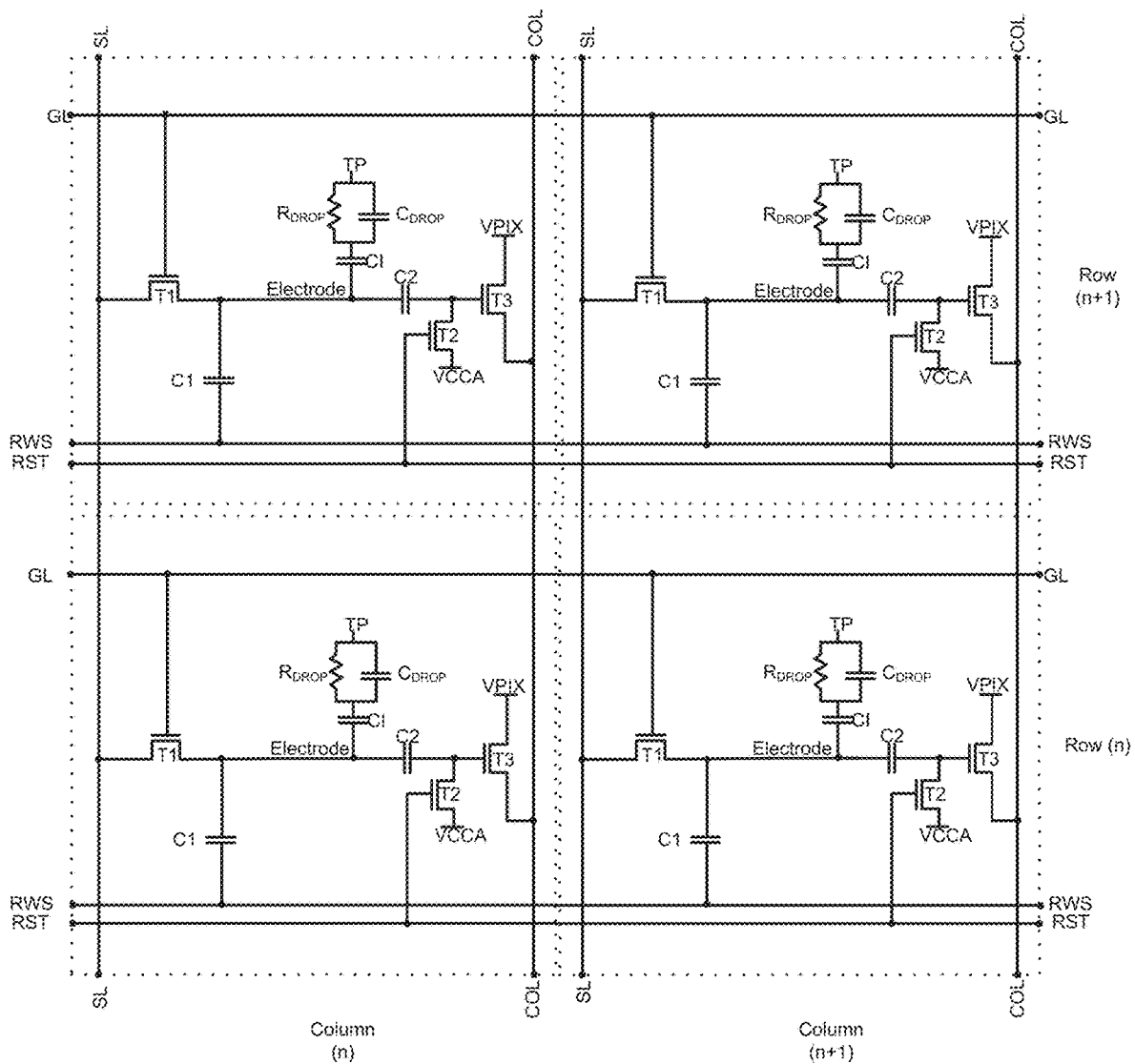
FIG. 12 is a drawing depicting a two-dimensional array of elements including exemplary array element circuitry for an AM-EWOD device that embodies a previous design of Applicant.

The above compensation for misalignment may be performed using any suitable array element circuitry. For example, FIG. 12 is a drawing depicting a two-dimensional array of elements including exemplary array element circuitry for an AM-EWOD device that embodies a previous design of Applicant. FIG. 12 depicts a 2×2 element array, although it will be appreciated that comparable principles are applicable to any array size. This basic array element circuitry has three thin film transistors (TFTs T1, T2, and T3) and two capacitors (C1 and C2), and is associated with seven addressing lines. The boundaries of a pixel are denoted by the dotted line. Row and column addressing lines are shown passing through the pixel in the horizontal and vertical directions respectively. Power supply connections, which could in principle be supplied either in row or column lines, are shown by short horizontal lines (e.g. VCCA in FIG. 12). Connecting wires are shown with a solder dot, and without the dot, crossing lines do not connect. The $R_{drop}$ and $C_{drop}$ represent the resistance and capacitance across the device from the reference (top) electrode TP to the hydrophobic coating on which the liquid droplet may sit, and any other insulator layers incorporated into the device are represented by the capacitance CI. The values of $R_{drop}$ and $C_{drop}$ will vary based on the presence or absence of a liquid droplet, as described above with respect to FIGS. 4A and 4B. Example AM-EWOD devices having this basic circuit design are described in Applicant's commonly assigned U.S. Pat. No. 8,653,832 (Hadwen et al., issued Feb. 18, 2014) and US 2018/0078934 (Hadwen et al., published Mar. 22, 2018).

As described in such previous patent documents, the circuitry of FIG. 12 generally is operated as follows as to each array element. To program an array element by writing voltage data to said array element, the voltage to be programmed is loaded onto addressing line SL, and a pulse is applied to the gate line GL appropriate for the row being programmed. This turns on a drive transistor T1, and the circuit node connected to the electrode is charged to the programmed voltage. When GL is taken low, this voltage is preserved, stored on a storage capacitor C1. Typically, C1 is larger than the second or sensor capacitor C2 by at least about an order of magnitude. To perform sensing, in a reset step a reset transistor T2 is turned on by an RST signal, so the gate of a sensor readout transistor T3 charges to VCCA. In conventional configurations, VCCA is a reset potential chosen below the threshold voltage of T3 such that T3 remains off and any previous voltage is cleared. In a sensing step, the RST signal is set low so that the gate of sensor readout transistor T3 is not driven and an addressing line RWS is pulsed. For the duration of the RWS pulse, the electrode potential is perturbed to a higher voltage. The change in voltage achieved is principally a function of the ratio of capacitor C1 to the total capacitance at the electrode, which includes the load associated with whether the droplet is present or absent. The perturbation is coupled through the sensor capacitor C2 to the gate of T3, and transistor T3 is accordingly turned on to an extent determined by the amplitude of the pulse as coupled. A pixel voltage supply VPIX provides a voltage input so as to generate an output current through T3, which again will be dependent upon the voltage coupled to the gate of T3. The resultant current passes through T3 and is sunk down a sensor output column line COL, which may then be sensed by detection circuitry at the bottom of the column (not shown).

This driving scheme may be modified for sensing a conductive locator in accordance with embodiments of the present invention. FIG. 13 is a timing diagram for operation of the circuitry of FIG. 12 to sense a locator in accordance with embodiments of the present invention. Generally, in a droplet sensing operation, a perturbation voltage is applied to an addressing line such as RWS. For sensing the conductive locator, as shown in FIG. 13 the RWS line instead is maintained at a DC voltage and a perturbing voltage is applied directly to the locator (LOC), which is illustrated schematically in FIG. 11 by the electrical connection of the voltage supply 160 to the locator 158. The resultant perturbation is coupled to the element electrodes of array elements in proximity to the locator. As further shown in FIG. 13, the magnitude of the perturbation of an element electrode potential varies in accordance with the degree of proximity to the locator. The magnitude of the perturbation of an element electrode potential in close proximity to the locator is greater as compared to the magnitude of the perturbation of an element electrode potential farther away from the locator. The magnitude of the electrode perturbation may be measured by measuring the resultant output current down the output column line COL. Commensurately, the magnitude of the output current measured from an element electrode in close proximity to the locator is greater as compared to the magnitude of the output current measured from an element electrode farther away from the locator.

It will be appreciated that a similar modification to the driving scheme can be applied to any suitable array element circuitry configuration, including the various circuit configurations described in the patent documents referenced in the background section of the current application.

Figure 14:
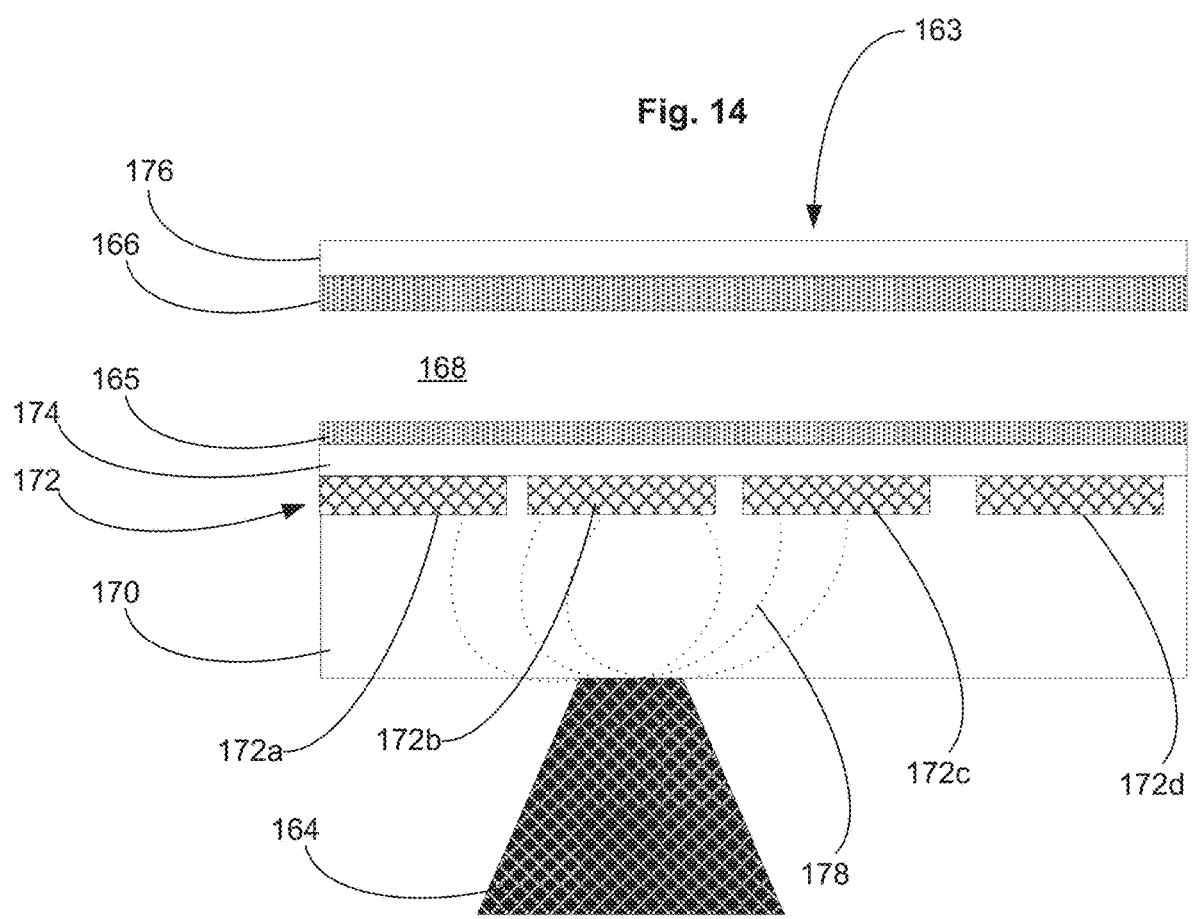
FIG. 14 is a drawing depicting an exemplary portion of an AM-EWOD cartridge in relation to a locator of a microfluidic instrument.

The above operation is further illustrated in FIG. 14, which is a drawing depicting an exemplary portion of an AM-EWOD cartridge 163 in relation to a locator 164 of a microfluidic instrument. Similarly as described above in connection with other figures, the microfluid cartridge 163 includes a first hydrophobic coating 165 and a second hydrophobic coating 166 that define a channel 168 into which liquid droplets and a filler fluid (e.g., oil) may be dispensed. The cartridge 163 further may include a TFT glass substrate 170 onto which there is patterned an array of element electrodes 172. Four element electrodes 172*a*-*d* are shown in this example, although comparable principles apply to any size electrode array. The element electrodes 172*a*-*d* are spaced apart from the first hydrophobic coating 165 by an ion barrier 174, and a reference electrode 176 may be deposited on the second hydrophobic coating 166 opposite from the channel 168.

FIG. 14 depicts a state in which a voltage is applied to the locator 164, which is conductive. The voltage perturbation applied to the locator 164 couples to the electrode array 172 capacitively through the glass substrate, as illustrated by representative field lines 178. The resultant electric field is strongest at the element electrode in closest proximity to the locator 164, which in this example is element electrode 172*b*. The electric field is weaker at element electrodes 172*a* and 172*c*, and essentially is negligible at element electrode 172*d*. In this manner, the modified method of driving causes the element array to function as a capacitive array sensor that can detect the position and proximity of a conductive locator 164 that is external to the microfluidic cartridge 163.

Figure 15:
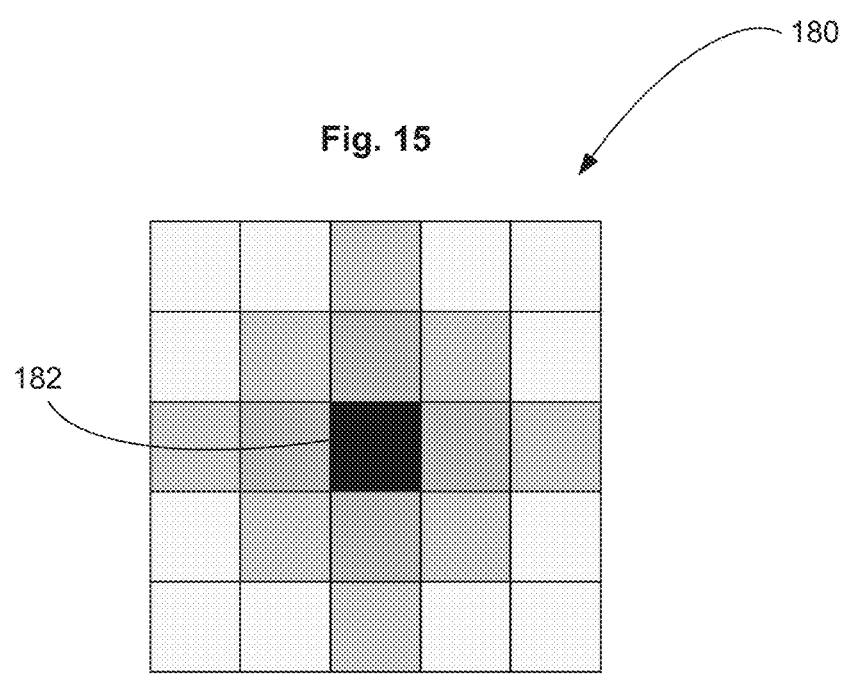
FIG. 15 is a drawing depicting an output image that is derived from output currents measured from an element array when a voltage perturbation is applied to a locator.

FIG. 15 is a drawing depicting an output image 180 that is derived from output currents measured from the element array 172 when a voltage perturbation is applied to the locator 164. The electrical interaction of the locator with the element array is indicated by the output image, with the shading in this example representing the degree of proximity of array elements to the locator with the darkest image portion 182 corresponding to the array element closest to the locator. Image portions that correspond to array elements farther form the locator are illustrated with less dark shading, with the shading darkness decreasing with distance from the locator. In this manner, the position of the locator relative to the element array is detectable to a resolution of around one array element (pixel). Such resolution is achieved with any common sized pixel in an AM-EWOD device, such as for example electrode widths of 200 um, 100 um or 50 um. The output image 180 may be generated by the control system, and based on the output image 180, the control system can modify the reaction protocol or script to adjust droplet positioning as warranted for optimal positioning of the liquid droplet for a droplet manipulation operation.

In the example of FIGS. 12-15, the locator sensing is considered active sensing in that the output image is derived from measuring the output current in response to a voltage perturbation applied to the locator. For array element circuitry of high sensitivity, passive sensing of a conductive locator can be sufficient provided such circuitry is sufficiently sensitive to detect a passive conductive locator to which no electrical signal or perturbation is applied. An example of such a high-sensitive circuit is described in Applicant's application Ser. No. 16/207,789 filed on Dec. 3, 2018, the contents of which are incorporated herein by reference. In such example, the sensing circuitry is improved by enhancing the sensitivity to very small capacitance variations, which for the present invention can be associated with locator positioning even without applying a voltage perturbation to the locator. As a non-limiting example of a high-sensitive circuit, to accomplish such enhanced sensitivity in the circuit design of the '789 application, a precharging effect is applied whereby the sensor readout transistor in an array element is altered to turn on the sensor readout transistor during a sensing phase. For example, a positive pre-charging voltage may be applied across the gate and source of the sensor readout transistor to turn said transistor on, or a negative voltage may be applied across the gate and source of a p-type sensor readout transistor to turn on the sensor readout transistor. The element array may be operated in either a self or mutual capacitance mode as described in the '789 Application. The positioning of the locator in near proximity to the element array results in interaction with the electric field distribution in a similar way as shown in FIG. 14, which results in a change in the capacitance measured as "present" at an electrode within the array.

The present invention thus provides a way of measuring the microfluidic instrument/microfluidic cartridge alignment. The alignment information subsequently is utilized by the control system to perform a compensation operation that includes feedback of the measured position information to align droplet manipulation operations, and adjustment of the reaction protocol or script to optimally align the droplet manipulation operations relative to pertinent microfluidic instrument components that are external to the microfluidic cartridge, such as for example instrument magnets, heater, or optical components (which also may act as the locators in the compensation method). In practice, this may be accomplished by the control system controlling actuation voltages to nudge or slightly move the centroid of a liquid droplet relative to the element array so the droplet centroid becomes optimally located relative to the pertinent instrument component.

An advantage of the present invention is that accounting for misalignment by adjusting the reaction protocol or script relaxes the mechanical tolerance requirements on cartridge/instrument alignment, which may make the cartridge and/or instrument easier and cheaper to produce. A further advantage is that the efficacy of a wash operation or other droplet manipulation operation may be improved by more accurate alignment by precise droplet position adjustments, which in the context of a wash operation in particular may reduce the volume of supernatant fluid surrounding a bead pellet, or otherwise may reduce the amounts of sample or reagent fluids that are required for a reaction protocol. The result is improved performance of droplet manipulation operations requiring critical or precise alignment, such as for example magnetic bead-based droplet operations (requiring precision alignment to instrument magnets), optical illumination and sensing (requiring precision alignment to optical components), and thermal control (requiring precision alignment to heater elements).

FIG. 16 is a cross-sectional drawing depicting a variation on the embodiment of FIG. 11, in which the exemplary portion on of the AM-EWOD cartridge 150 is positioned in relation to multiple locators, e.g., a first locator 158 and a second locator 159 of a microfluidic instrument 154. FIG. 17 is a drawing depicting a top view of the array of element electrodes 153 of FIG. 16 in relation to the locators 158 and 159. The locators 158 and 159 are positioned respectively at Positions A and B relative to the element array 153. By measuring the position of the element array 153 relative to multiple locators, the position of the cartridge 153 relative to the microfluidic instrument may be measured in two dimensions relative to the x-y plane of the element array. With such measurements, compensation of the reaction protocol or script for errors in position may be implemented accounting for planar x-y and rotational misalignment.

FIG. 18 is a drawing depicting a variation on the embodiment of FIGS. 11 and 16, in which the exemplary portion on of the AM-EWOD cartridge 150 is positioned in relation to multiple locators e.g., a first locator 158 and a second locator 159 of a microfluidic instrument, and the locators may be positioned at different distances spaced apart from or relative to the element array 153. As referenced above, locators may correspond to instrument components utilized for certain operations, such as magnets for bead-based washing, heaters for thermal control, optical components for illumination and making optical measurements, and the like. Particularly as to magnets, it is desirable to move the magnets to be adjacent to or nearly touching the cartridge substrate when bead-based washing is performed, and moved father away from the cartridge substrate when washing is not being performed to preclude any undesirable effects from magnetic fields. With such a system, location measurements with respect to multiple locators located at different distances with respect to the element array, and particularly instrument magnets, may provide an enhanced measurement of cartridge position relative to the locators to aid in determining planar x-y or rotational misalignment.

In this regard, FIG. 19 is a drawing depicting an output image 184 that is derived from output currents measured from the element array 153 when a voltage perturbation is applied to the first and second locators 158 and 159. As shown in FIG. 18, first locator 158 is essentially touching or near touching the cartridge substrate and second locator 159 is spaced farther apart from the cartridge substrate. Similarly as illustrated in the output image 180 of FIG. 15, as to the output image 184 of FIG. 19, the electrical interaction of the locators with the element array is illustrated with shading representing the degree of proximity of array elements to the locator, with the darker image portions corresponding to the array elements closest to the locator. In this example, image portion 186 is darkest as corresponding to the array element that is nearest to the first locator 158 that is essentially touching or near touching the cartridge substrate. Image portion 188 corresponds to an array element nearest to the second locator 159. Image portion 188 thus appears less darkly shaded as compared to image portion 186 because the second locator 159 is father from the cartridge substrate than the first locator 158. Such measurements based on locators at different distances relative to the cartridge substrate may be used to detect the position of the cartridge in a "z" direction perpendicular to a plane of the electrode array 153. Accordingly, such measurements may be used to compensate functions performed by the instrument for which z-alignment is significant, such as for example intensity of a light source (e.g., when the cartridge is further away, light intensity is increased), positioning of pipettes for fluid input or extraction, or for focus adjustment of detection optics such as a camera.

Figure 20:
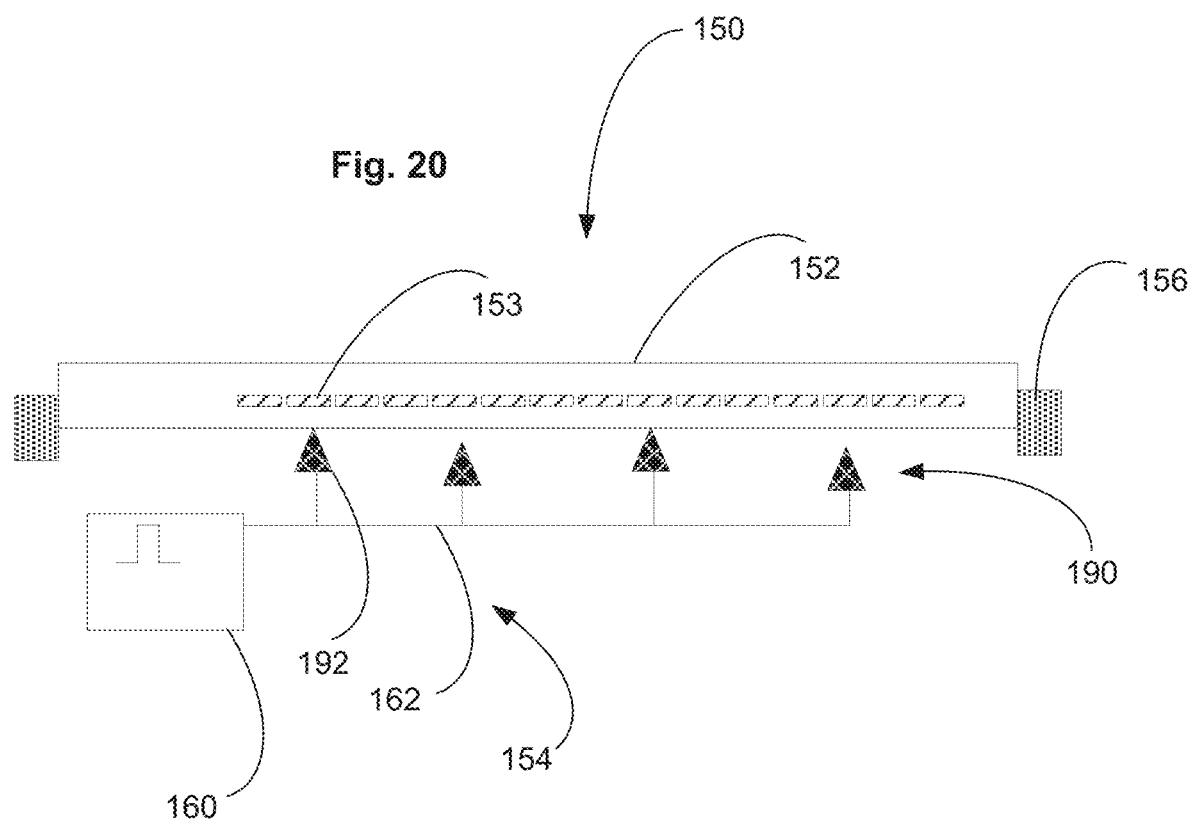
FIG. 20 is a drawing depicting a variation on the embodiment of FIG. 8, in which the exemplary portion of the AM-EWOD cartridge is positioned in relation to a magnet array of a microfluidic instrument.

FIG. 20 is a cross-sectional drawing depicting a variation on the embodiment of FIG. 18, in which the exemplary portion on of the AM-EWOD cartridge 150 is positioned in relation to a magnet array 190 of a microfluidic instrument. In this embodiment, the magnet array 190 includes multiple magnet elements 192 that may act as multiple locators. As seen in such figure, some of the magnet elements may be located essentially touching or near touching the cartridge substrate, while some of the magnet elements may be spaced apart from the substrate and may be at different distances. As a matter of manufacturing, the magnet elements are movable toward and away from the cartridge substrate as needed for fluidic operations, and it desirable that all magnet elements be essentially touching the cartridge substrate when in the "up" position for use. Based on mechanical tolerances, however, there may be a slight variation of positioning when the magnet elements are moved into the position of use. In this example, the spacing is exaggerated, as the difference in spacing resulting from mechanical tolerances is slight (on the order of fractions of a millimeter), but is still measurable.

Accordingly, the magnet elements 192 that form the magnet array 190 are to be moved up or down as a single component with a common drive mechanism. When brought into the "up" position adjacent to the cartridge substrate, however, not all magnet elements will be precisely touching the cartridge substrate due to the mechanical tolerances. Measurement of the intensity of coupling from each magnet position can be used to determine which magnets are touching, how far away non-touching magnets are, and whether this configuration is within a requisite specification. If not, an error can be reported. In this manner, using the magnet elements as locators for measuring cartridge positioning may be used as a quality control function to ensure that any mechanical misalignments or deviations of magnet elements or other instrument components fall within acceptable specification ranges.

Figure 21:
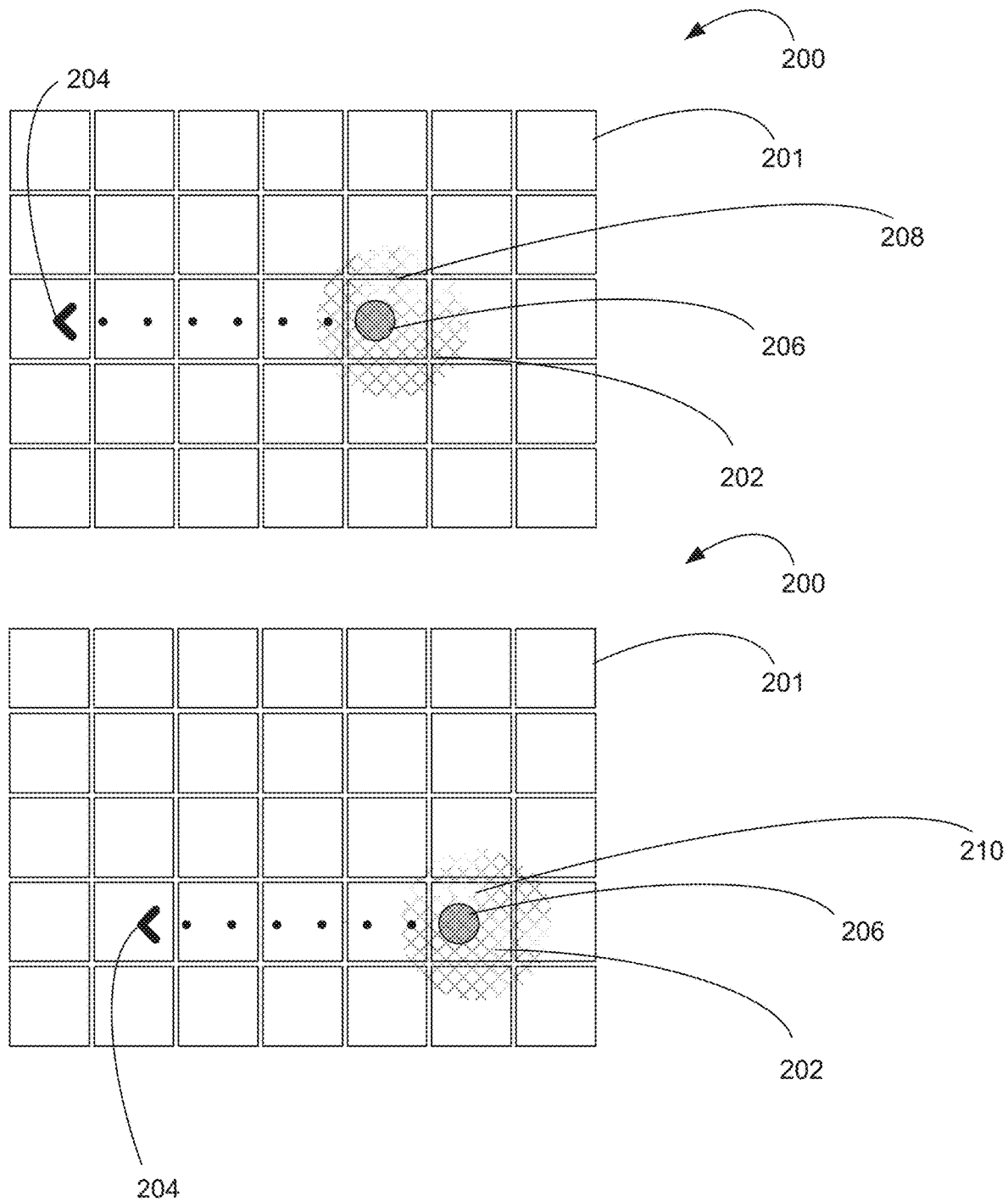
FIG. 21 is a drawing depicting an exemplary compensation operation performed in accordance with embodiments of the present invention.

As referenced above, by measuring the precise positioning of the one or more locators, misalignment of the microfluidic cartridge relative to the microfluidic instrument can be compensated by adjustments to a reaction protocol or script. FIG. 21 is a drawing depicting an exemplary compensation operation performed in accordance with embodiments of the present invention. In FIG. 21, an element array 200 of individual array elements 201 has dispensed thereon a liquid droplet 202 as to which a manipulation operation is to be performed as denoted by the arrow 204 (e.g., moving the position of the droplet). This operation is to be performed in relation to a locator 206 located within the microfluidic instrument, for example a magnet element.

The top portion of FIG. 21 illustrates the expected position of the locator 206 relative to the element array 200 based on mechanical insertion of the microfluidic cartridge relative to the microfluidic instrument. Based on simple mechanical assertion, the locator is expected to be adjacent to array element 208, and thus the initial reaction protocol or script calls for electrowetting forces to move the liquid droplet 202 to be positioned at the array element 208. As shown in the bottom portion of FIG. 21, however, due to mechanical tolerances, the actual position of the locator 206 as measured using any of the embodiments above is adjacent to array element 210. In this example, therefore, there is a misalignment of one pixel down and one pixel right from the expected position (based on the orientation of the figure). If the initial reaction protocol were to be followed, therefore, the droplet 202 would not be placed optimally to perform the desired droplet manipulation operation, e.g., a bead-based washing using a magnet 206 followed by magnet separation such as shown in FIG. 10 when moving the droplet. To compensate for the misalignment, therefore, the initial reaction protocol or script is modified to an adjusted reaction protocol or script, whereby the position of the liquid droplet 202 is modified from array element 208 to array element 210 to compensate for the misalignment.

More generally, such compensation methods may be employed for any suitable reaction protocol in which certain droplet manipulation operations should be performed at fixed positions. Examples (without limitation) of such operations include fluid input and extraction, magnetic bead-based washing, thermal control, optical illumination and sensing, and the like. In the example of FIG. 21, a single droplet operation is positionally adjusted. In an alternative compensation method, the position of the whole reaction protocol is adjusted. Comprehensive positional adjustment may be advantageous, for example, when fluid loading and/or extraction is automatically performed by the microfluidic instrument whereby it is advantageous to align the fluid ports with the loading/extracting instrument, and it would thus be beneficial that all the droplet operations in the reaction protocol be adjusted in accordance with fluid input and/or extraction positions.

Figure 22:
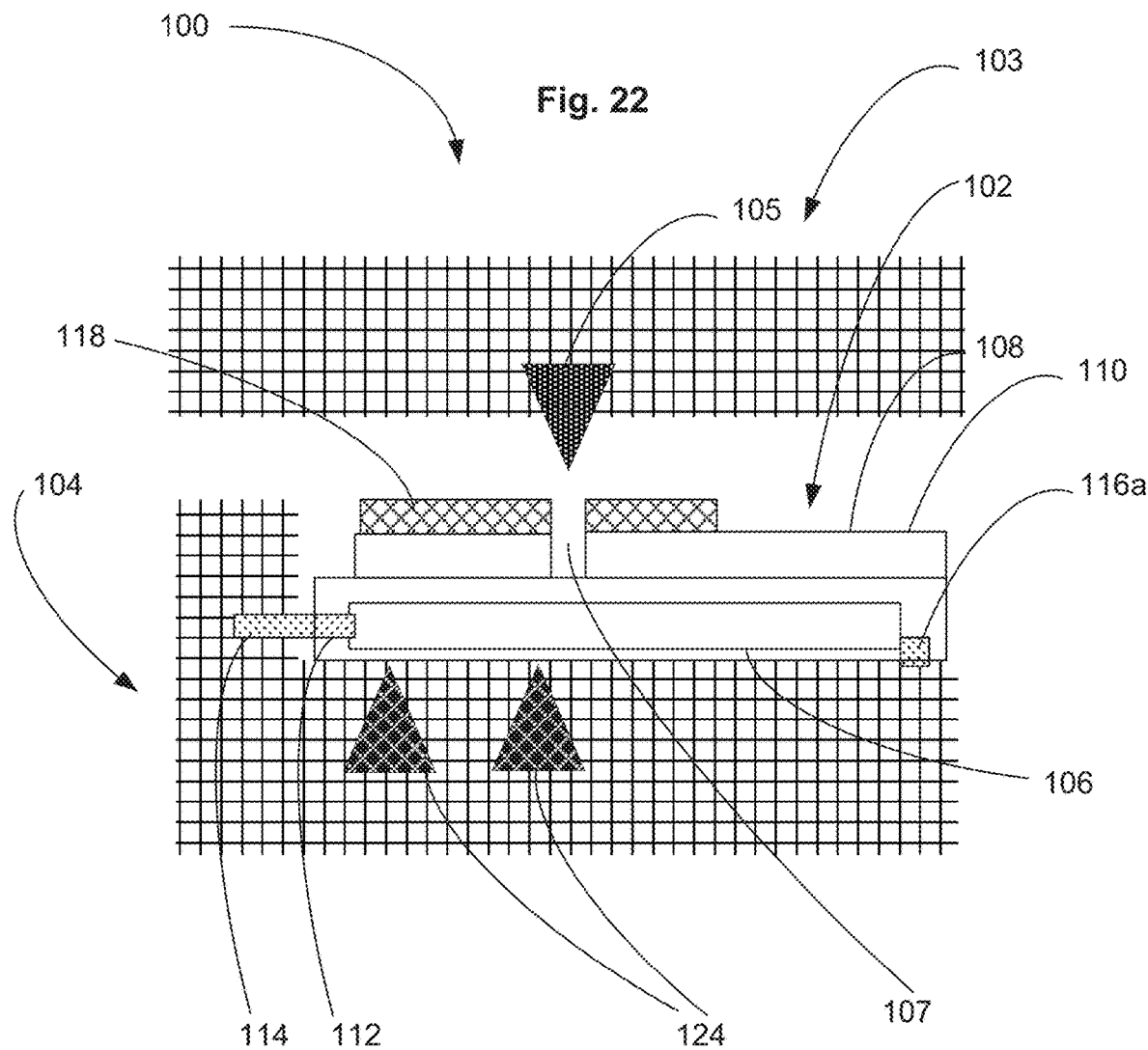
FIG. 22 is a schematic drawing depicting a variation on the exemplary microfluidic system of FIG. 8, wherein the microfluidic instrument includes an automated input/extraction component.

FIG. 22 is a cross-sectional schematic drawing depicting a variation on the exemplary microfluidic system 100 of FIG. 8, wherein the microfluidic instrument 104 includes an automated input/extraction component 103. The automated input/extraction component 103 may be an automated pipetting device integrated into the microfluidic instrument 104, or may be a component separate from the portion of the microfluidic instrument that receives the microfluidic cartridge. Using an automated input/extraction component 103, the position of an input/extraction element 105, such as for example a pipette, in the x-y plane above the plane of the element array of the microfluidic cartridge 102 may be adjusted in accordance with the measured position of the locators, which in this example are the magnets 124 although any suitable locators may be used. The position of the locators in turn is used to measure the position of the microfluidic cartridge 102. The microfluidic cartridge 102 includes a fluid port 107 that may be used for fluid input and/or extraction, and thus the position of the microfluidic cartridge is indicative of the position of the fluid port 107 relative to the pipette 105. If there is a misalignment of the microfluidic cartridge relative to the microfluidic instrument based on the measurements of the locator positions, the position of the automated input/extraction component 103 may be adjusted to optimally align the pipette 105 with the fluid port 107.

FIG. 23 is a schematic drawing depicting a variation on the exemplary microfluidic system 100 of FIG. 22, wherein the microfluidic instrument 104 includes an optical instrument 109. The optical instrument 109 implements optical illumination and/or sensing using an optics system 111, which may include for example an illumination light source (e.g., laser, LED) and/or an optical sensor (e.g. photodiode, avalanche photodiode), with the position of the optical instrument 109 being precisely determined relative to the element array. The optical instrument 109 may be integrated as part of the microfluidic instrument or a component separate from the portion of the microfluidic instrument that receives the microfluidic cartridge. The position of the optical instrument 109 relative to the element array of the microfluidic cartridge 102 may be adjusted in accordance with the measured position of the locators, which in this example again are the magnets 124 although any suitable locators may be used. If there is a misalignment of the microfluidic cartridge relative to the optical instrument 109 based on the measurements of the locator positions, the position of the optical instrument 109 may be adjusted to optimally align the optics system 111 with any array element that has a liquid droplet that is to be optically illuminated and/or sensed.

An aspect of the invention, therefore, is a microfluidic system and related method of operation that accounts for misalignment of an AM-EWOD cartridge relative to a microfluidic instrument (i.e. an instrument that controls the microfluidic cartridge) by determining a position of a locator component of the microfluidic instrument, and modifying a reaction protocol or script of droplet manipulation operations in a manner that compensates for the misalignment. In exemplary embodiments, the microfluidic system includes: an electro-wetting on dielectric (EWOD) cartridge comprising an element array configured to receive liquid droplets, the element array comprising a plurality of individual array elements each including array element circuitry comprising sensing circuitry that is integrated into the array element circuitry; a microfluidic instrument that is configured to receive the EWOD cartridge and having an electrically conductive locator that is external to the EWOD cartridge; and a control system configured to perform electrowetting operations by controlling actuation voltages applied to the element array to perform manipulation operations as to liquid droplets present on the element array. The control system further is configured to: read an output from the sensing circuitry; determine a position of the locator relative to the element array based on the output; and determine a misalignment of the EWOD cartridge relative to the microfluidic instrument based on the determined position of the locator. The microfluidic system may include one or more of the following features, either individually or in combination.

In an exemplary embodiment of the microfluidic system, the system further includes a voltage supply that applies a voltage perturbation to the locator, and the control system reads the output from the sensing circuitry in response to the voltage perturbation applied to the locator.

In an exemplary embodiment of the microfluidic system, the locator includes a magnet element.

In an exemplary embodiment of the microfluidic system, the locator comprises a magnet array comprising a plurality of magnet elements that are movable relative to the EWOD cartridge, and the controller is configured to determine the position of each magnet element relative to the element array.

In an exemplary embodiment of the microfluidic system, the locator comprises a plurality of locator elements and the controller is configured to determine the position of each locator element relative to the element array.

In an exemplary embodiment of the microfluidic system, the locator includes one or more of a magnet element, a heater, and an optical component.

In an exemplary embodiment of the microfluidic system, the controller further is configured to adjust a manipulation operation of a liquid droplet to compensate for the determined misalignment of the EWOD cartridge relative to the microfluidic instrument.

In an exemplary embodiment of the microfluidic system, the controller is configured to adjust the manipulation operation by performing an electrowetting operation to move a liquid droplet to a position that is optimal relative to a component of the microfluidic instrument that is employed during the manipulation operation.

In an exemplary embodiment of the microfluidic system, the component of the microfluidic instrument that is employed during the manipulation operation includes the locator.

Another aspect of the invention is a related method of operating a microfluidic system according to any of the embodiments. In exemplary embodiments, the method of operating includes the steps of: reading an output from the sensing circuitry; determining a position of the locator relative to the element array based on the output; determining a misalignment of the EWOD cartridge relative to the microfluidic instrument based on the position of the locator; and adjusting a manipulation operation of a liquid droplet to compensate for the determined misalignment of the EWOD cartridge relative to the microfluidic instrument. The method of operating may include one or more of the following features, either individually or in combination.

In an exemplary embodiment of the method of operating, the method further includes applying a voltage perturbation to the locator, and reading the output from the sensing circuitry in response to the voltage perturbation applied to the locator.

In an exemplary embodiment of the method of operating, the method further includes determining a misalignment of the EWOD cartridge relative to a component of the microfluidic instrument that is employed during the manipulation operation; and adjusting the manipulation operation by performing an electrowetting operation to move a liquid droplet to a position that is optimal relative to the component of the microfluidic instrument that is employed during the manipulation operation.

In an exemplary embodiment of the method of operating, the component of the microfluidic instrument that is employed during the manipulation operation includes the locator.

In an exemplary embodiment of the method of operating, the locator is a magnet element and the manipulation operation is a magnetic bead-based washing and separation operation.

In an exemplary embodiment of the method of operating, a reaction protocol comprises a plurality of manipulation operations, and the method further comprises performing an electrowetting operation to move one or more liquid droplets to respective positions that are optimal relative to components of the microfluidic instrument that are employed during a plurality of manipulation operations that are part of the reaction protocol.

In an exemplary embodiment of the method of operating, the locator includes multiple locator elements, and the method further comprises determining a misalignment of the EWOD cartridge relative to the microfluidic instrument in the two-dimensional x-y plane corresponding to the element array, and/or determining a rotational misalignment of the EWOD cartridge relative to the microfluidic instrument.

In an exemplary embodiment of the method of operating, the locator comprises a magnet array having plurality of magnet elements that is movable between a first position closest to the EWOD cartridge and a second position farthest from the EWOD cartridge, the method comprising the steps of: moving the magnet array to the first position; determining a distance of each magnet element from the EWOD cartridge; determining whether the distances satisfy a specification; and outputting the result of the determination of whether the distances satisfy the specification.

In an exemplary embodiment of the method of operating, the method further includes generating an output image based on the output from the sensing circuitry that indicates the position of the locator relative to the element array.

Another aspect of the invention is a non-transitory computer-readable medium storing program code which is executed by a processing device for controlling a microfluidic system, the processing device being configured to perform electrowetting operations by controlling actuation voltages applied to the element array to perform manipulation operations as to liquid droplets present on the element array. The program code is executable by the processing device to perform the method steps accordingly to any of the embodiments.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

The described embodiments could be used to provide an enhanced AM-EWOD device. The AM-EWOD device could form a part of a lab-on-a-chip system. Such devices could be used for optical detection of biochemical or physiological materials, such as for cell detection and cell counting. Applications include healthcare diagnostic testing, material testing, chemical or biochemical material synthesis, proteomics, tools for research in life sciences and forensic science.

REFERENCE SIGNS LIST

32—reader
34—cartridge
35—external sensor module
36—AM-EWOD device
38—control electronics
40—storage device
44—lower substrate assembly
46—thin film electronics
48—array element electrodes
48A—array element electrode
48B—array element electrode
50—two-dimensional element array
51—array element
52—liquid droplet
54—top substrate
56—spacer
58—reference electrode
60—non-polar fluid
62—insulator layer
64—first hydrophobic coating
66—contact angle
68—second hydrophobic coating
70A—electrical load with droplet present
70B—electrical load without droplet present
72—array element circuit
74—integrated row driver
76—column driver
78—integrated sensor row addressing
80—column detection circuits
82—serial interface
84—voltage supply interface
86—connecting wires
88—actuation circuit
90—droplet sensing circuit
100—AM-EWOD microfluidic system
102—microfluidic cartridge
103—automated input/extraction component
104—microfluidic instrument
105—input/extraction element
106—thin film transistor (TFT) glass substrate
107—fluid port
108—top substrate
109—optical instrument
110—plastic housing
111—optics system
112—first electrical connector
114—second electrical connector
116a—docking feature
116b—docking feature
118—housing features
120—heater elements
122—optical components or sensors
124—magnet elements
126—control system
128—instrument electronics
130—data link
132—actuation data signals
134—sensor data signals
136—instrument/cartridge electrical connector interface
138—storage device
140—element array 142—individual array elements
144—liquid droplets
146—magnetic bead clump
150—microfluidic system
152—microfluidic cartridge
153—element array
154—microfluidic instrument
156—instrument docking features
158—conductive locator
159—second locator
160—voltage supply
162—electrical connector
163—AM-EWOD cartridge
164—locator
165—first hydrophobic coating
166—second hydrophobic coating
168—channel
170—TFT glass substrate
172—element electrodes
172a—element electrode
172b—element electrode
172c—element electrode
172d—element electrode
174—ion barrier
176—reference electrode
178—representative field lines
180—output image
182—darkest image portion
184—output image
186—darkest image portion
188—less dark image portion
190—magnet array
192—magnet elements
200—element array
201—individual array elements
202—liquid droplet
204—arrow
206—locator
208—array element
210—array element

What is claimed is:

1. A microfluidic system comprising:
an electro-wetting on dielectric (EWOD) cartridge comprising an element array configured to receive liquid droplets, the element array comprising a plurality of individual array elements each including array element circuitry comprising sensing circuitry that is integrated into the array element circuitry;
a microfluidic instrument that is configured to receive the EWOD cartridge and having an electrically conductive locator that is external to the EWOD cartridge; and
a control system configured to perform electrowetting operations by controlling actuation voltages applied to the element array to perform manipulation operations as to liquid droplets present on the element array;
wherein the control system further is configured to:
read an output from the sensing circuitry;
determine a position of the locator relative to the element array based on the output; and
determine a misalignment of the EWOD cartridge relative to the microfluidic instrument based on the determined position of the locator.

2. The microfluidic system of claim 1, further comprising a voltage supply that applies a voltage perturbation to the locator, and the control system reads the output from the sensing circuitry in response to the voltage perturbation applied to the locator.

3. The microfluidic system of claim 1, wherein the locator includes a magnet element.

4. The microfluidic system of claim 1, wherein the locator comprises a magnet array comprising a plurality of magnet elements that are movable relative to the EWOD cartridge, and the controller is configured to determine the position of each magnet element relative to the element array.

5. The microfluidic system of claim 1, wherein the locator comprises a plurality of locator elements and the controller is configured to determine the position of each locator element relative to the element array.

6. The microfluidic system of claim 1, wherein the locator includes one or more of a magnet element, a heater, and an optical component.

7. The microfluidic system of claim 1, wherein the controller further is configured to adjust a manipulation operation of a liquid droplet to compensate for the determined misalignment of the EWOD cartridge relative to the microfluidic instrument.

8. The microfluidic system of claim 7, wherein the controller is configured to adjust the manipulation operation by performing an electrowetting operation to move a liquid droplet to a position that is optimal relative to a component of the microfluidic instrument that is employed during the manipulation operation.

9. The microfluidic system of claim 8, wherein the component of the microfluidic instrument that is employed during the manipulation operation includes the locator.

10. A method of operating a microfluidic system;
wherein the microfluidic system comprises:
an electro-wetting on dielectric (EWOD) cartridge comprising an element array configured to receive liquid droplets, the element array comprising a plurality of individual array elements each including array element circuitry comprising sensing circuitry that is integrated into the array element circuitry;
a microfluidic instrument that is configured to receive the EWOD cartridge and having an electrically conductive locator that is external to the EWOD cartridge; and
a control system configured perform electrowetting operations by controlling actuation voltages applied to the element array to perform manipulation operations as to liquid droplets present on the element array;
the method of operating comprising the steps of:
reading an output from the sensing circuitry;
determining a position of the locator relative to the element array based on the output;
determining a misalignment of the EWOD cartridge relative to the microfluidic instrument based on the position of the locator; and
adjusting a manipulation operation of a liquid droplet to compensate for the determined misalignment of the EWOD cartridge relative to the microfluidic instrument.

11. The method of operating of claim 10, further comprising applying a voltage perturbation to the locator, and reading the output from the sensing circuitry in response to the voltage perturbation applied to the locator.

12. The method of operating of claim 10, further comprising:
determining a misalignment of the EWOD cartridge relative to a component of the microfluidic instrument that is employed during the manipulation operation; and
adjusting the manipulation operation by performing an electrowetting operation to move a liquid droplet to a position that is optimal relative to the component of the microfluidic instrument that is employed during the manipulation operation.

13. The method of operating of claim 12, wherein the component of the microfluidic instrument that is employed during the manipulation operation includes the locator.

14. The method of operating of claim 10, wherein the locator is a magnet element and the manipulation operation is a magnetic bead-based washing and separation operation.

15. The method of operating of claim 10, wherein a reaction protocol comprises a plurality of manipulation operations, and the method further comprises performing an electrowetting operation to move one or more liquid droplets to respective positions that are optimal relative to components of the microfluidic instrument that are employed during a plurality of manipulation operations that are part of the reaction protocol.

16. The method of operating of claim 10, wherein the locator includes multiple locator elements, and the method further comprises determining a misalignment of the EWOD cartridge relative to the microfluidic instrument in the two-dimensional x-y plane corresponding to the element array, and/or determining a rotational misalignment of the EWOD cartridge relative to the microfluidic instrument.

17. The method of operating of claim 10, wherein the locator comprises a magnet array having plurality of magnet elements that is movable between a first position closest to the EWOD cartridge and a second position farthest from the EWOD cartridge, the method comprising the steps of:
   moving the magnet array to the first position;
   determining a distance of each magnet element from the EWOD cartridge;
   determining whether the distances satisfy a specification; and
   outputting the result of the determination of whether the distances satisfy the specification.

18. The method of operating of claim 10, further comprising generating an output image based on the output from the sensing circuitry that indicates the position of the locator relative to the element array.

19. A non-transitory computer-readable medium storing program code which is executed by a processing device for controlling a microfluidic system;
   wherein the microfluidic system comprises an electrowetting on dielectric (EWOD) cartridge comprising an element array configured to receive liquid droplets, the element array comprising a plurality of individual array elements each including array element circuitry comprising sensing circuitry that is integrated into the array element circuitry; and a microfluidic instrument that is configured to receive the EWOD cartridge and having an electrically conductive locator that is external to the EWOD cartridge;
   the processing device being configured to perform electrowetting operations by controlling actuation voltages applied to the element array to perform manipulation operations as to liquid droplets present on the element array;
   the program code being executable by the processing device to perform the steps of:
      reading an output from the sensing circuitry;
      determining a position of the locator relative to the element array based on the output;
      determining a misalignment of the EWOD cartridge relative to the microfluidic instrument based on the position of the locator; and
      adjusting a manipulation operation of a liquid droplet to compensate for the determined misalignment of the EWOD cartridge relative to the microfluidic instrument.

20. The non-transitory computer-readable medium of claim 19, wherein the processing device further executes the program code to perform the steps of applying a voltage perturbation to the locator, and reading the output from the sensing circuitry in response to the voltage perturbation applied to the locator.

* * * * *